United States Patent
Tsuchitoi et al.

(10) Patent No.: US 8,724,160 B2
(45) Date of Patent: May 13, 2014

(54) IMAGE FORMING APPARATUS, IMAGE FORMING SYSTEM, AND NON-TRANSITORY COMPUTER READABLE MEDIUM STORING CONTROL PROGRAM

(75) Inventors: Yuki Tsuchitoi, Kanagawa (JP); Manabu Hayashi, Kanagawa (JP); Naoya Nobutani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 104 days.

(21) Appl. No.: 13/403,663

(22) Filed: Feb. 23, 2012

(65) Prior Publication Data
US 2013/0070302 A1  Mar. 21, 2013

(30) Foreign Application Priority Data
Sep. 21, 2011  (JP) ................. 2011-206036

(51) Int. Cl.
*G06F 15/00* (2006.01)
(52) U.S. Cl.
USPC ........................................... 358/1.18
(58) Field of Classification Search
USPC ........................................... 358/1.18
See application file for complete search history.

(56) References Cited

U.S. PATENT DOCUMENTS

| | | |
|---|---|---|
| 2002/0159089 A1 | 10/2002 | Wiebe et al. |
| 2004/0100642 A1* | 5/2004 | Nozato .................. 358/1.6 |
| 2005/0200610 A1 | 9/2005 | Skantze et al. |
| 2007/0127055 A1* | 6/2007 | Kujirai et al. ............. 358/1.14 |
| 2010/0079807 A1 | 4/2010 | Wiebe et al. |

FOREIGN PATENT DOCUMENTS

| | | |
|---|---|---|
| JP | 2006-504181 A | 2/2006 |
| JP | 2008-282411 A | 11/2008 |
| JP | 4215516 B2 | 1/2009 |

OTHER PUBLICATIONS

Australian Office Action issued in corresponding AU Patent Application No. 2012201604 dated Aug. 21, 2013.

* cited by examiner

*Primary Examiner* — Saeid Ebrahimi Dehkordy
(74) *Attorney, Agent, or Firm* — Sughrue Mion, PLLC

(57) ABSTRACT

An image forming apparatus includes an accumulation unit, an instruction unit, an output unit, an identifier computing unit a combining unit and a change unit, wherein the combining unit does not perform the combining for an increased copy number when the change unit increases the print copy number information.

15 Claims, 28 Drawing Sheets

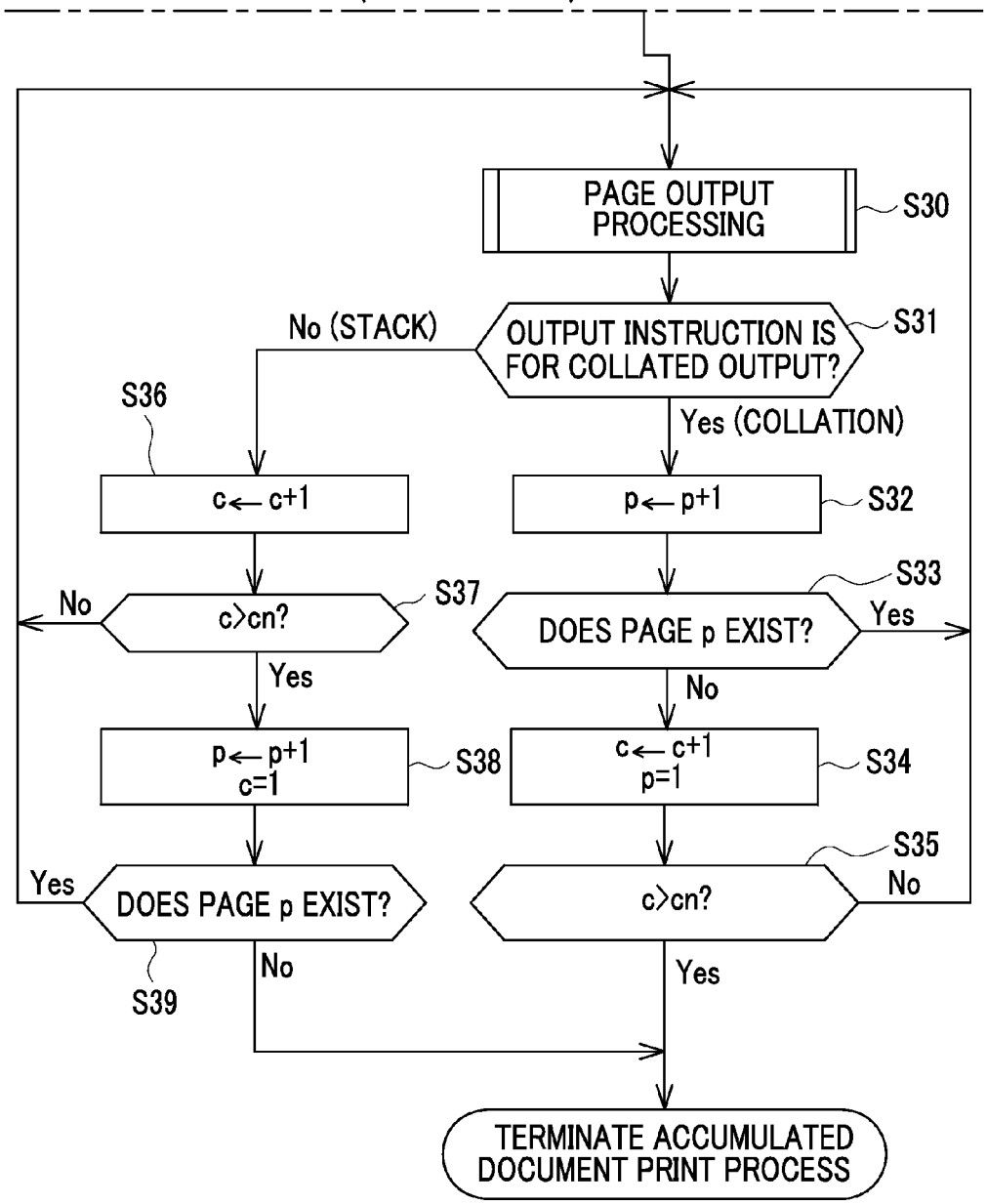

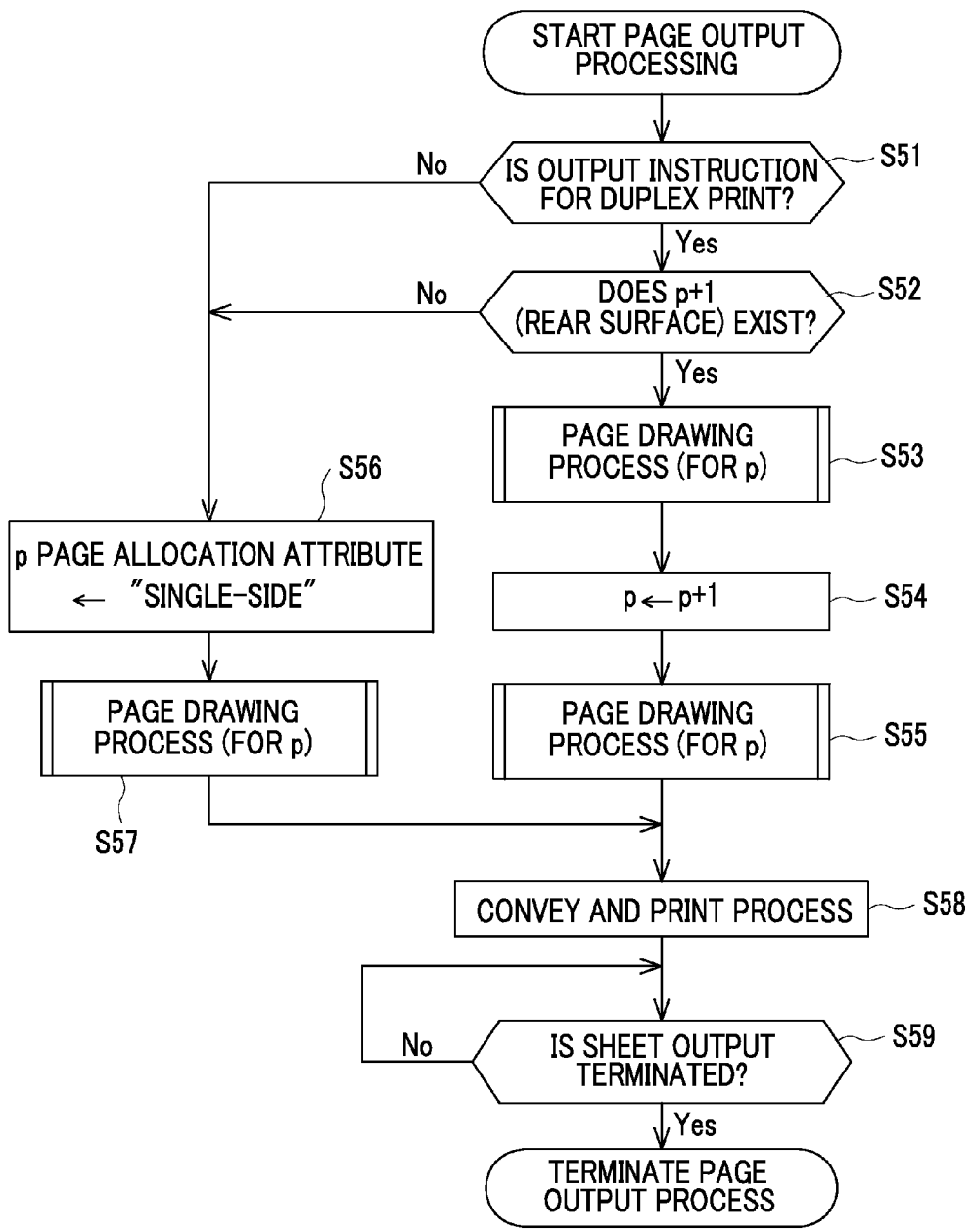

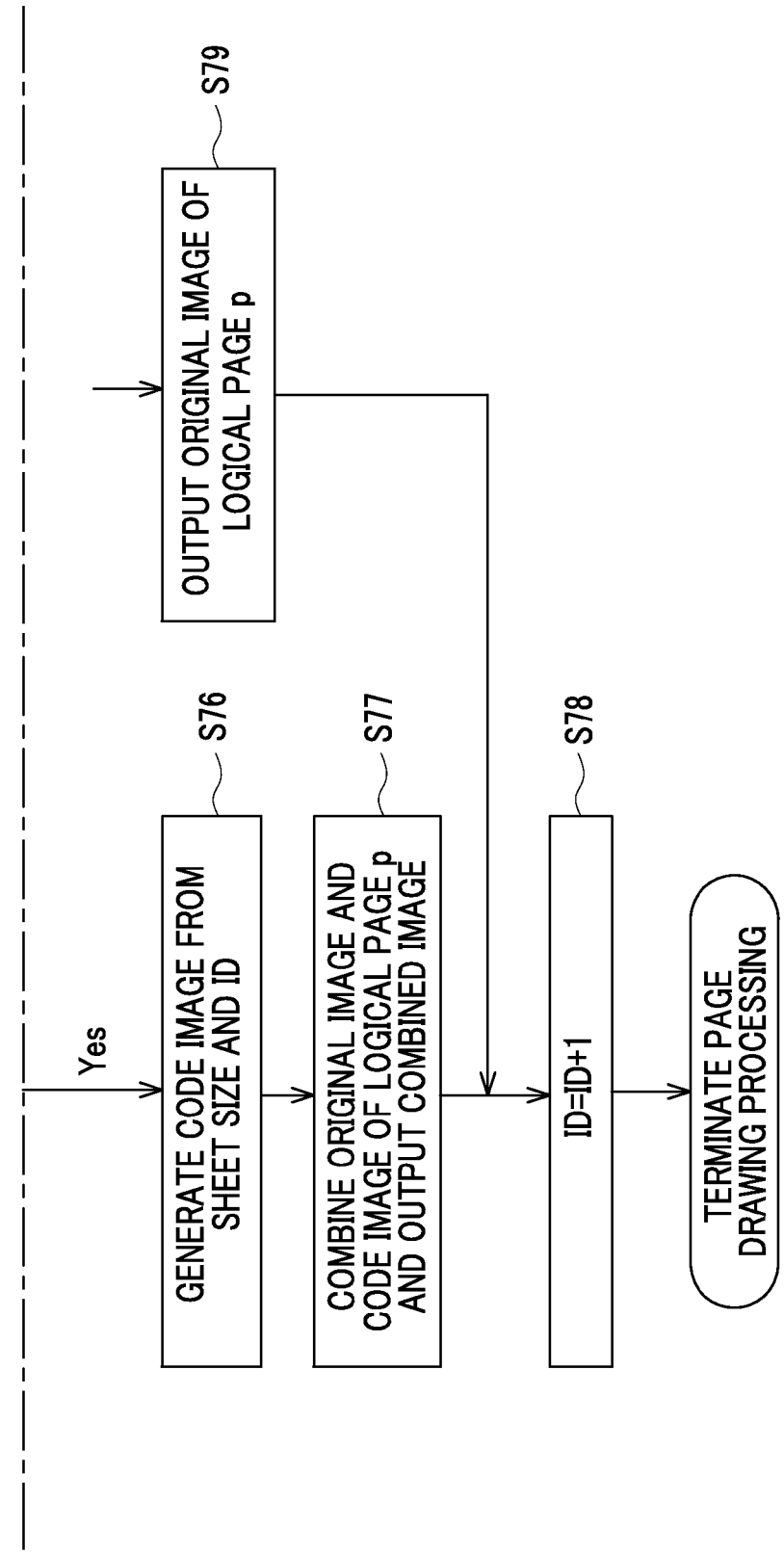

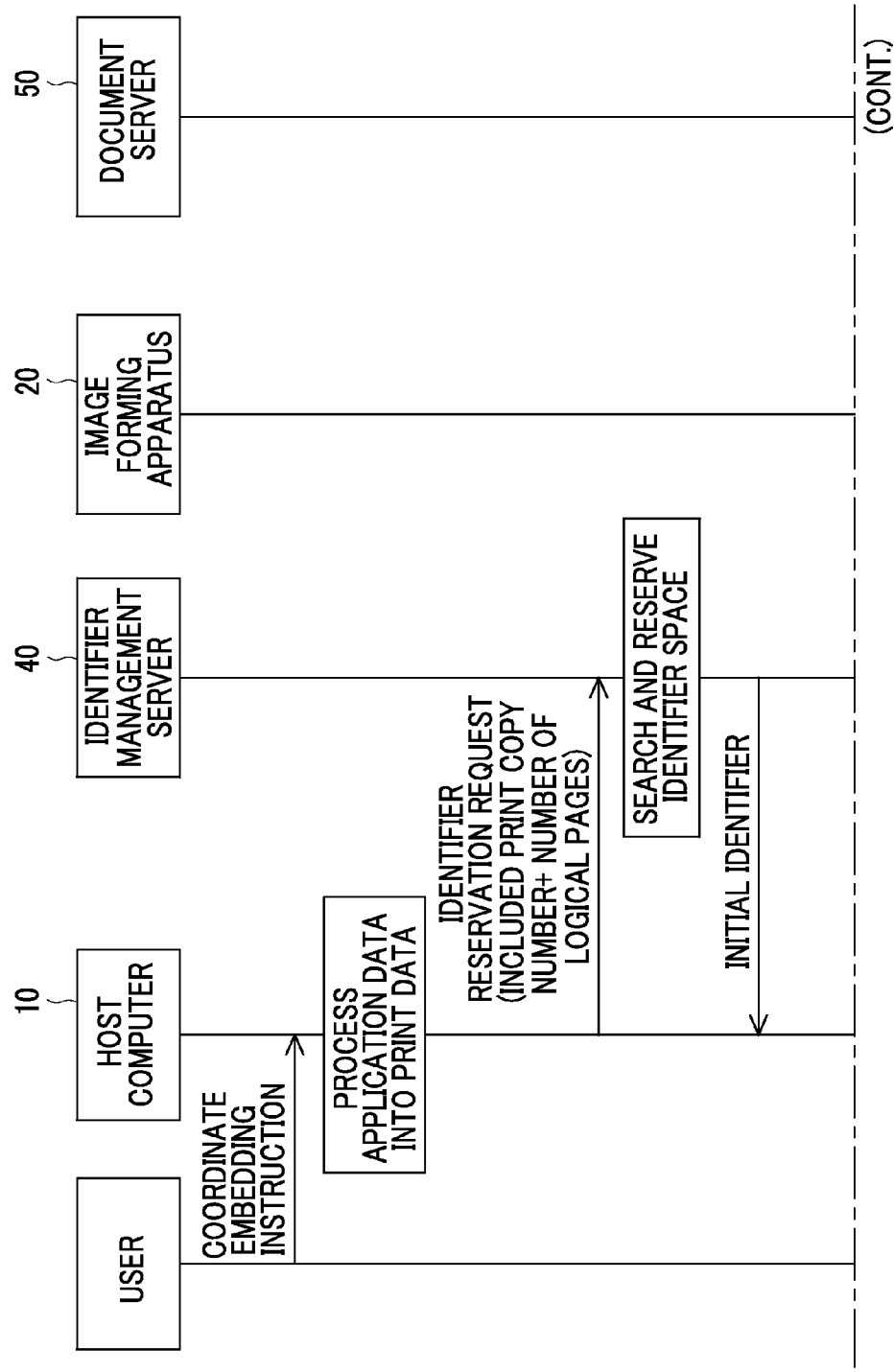

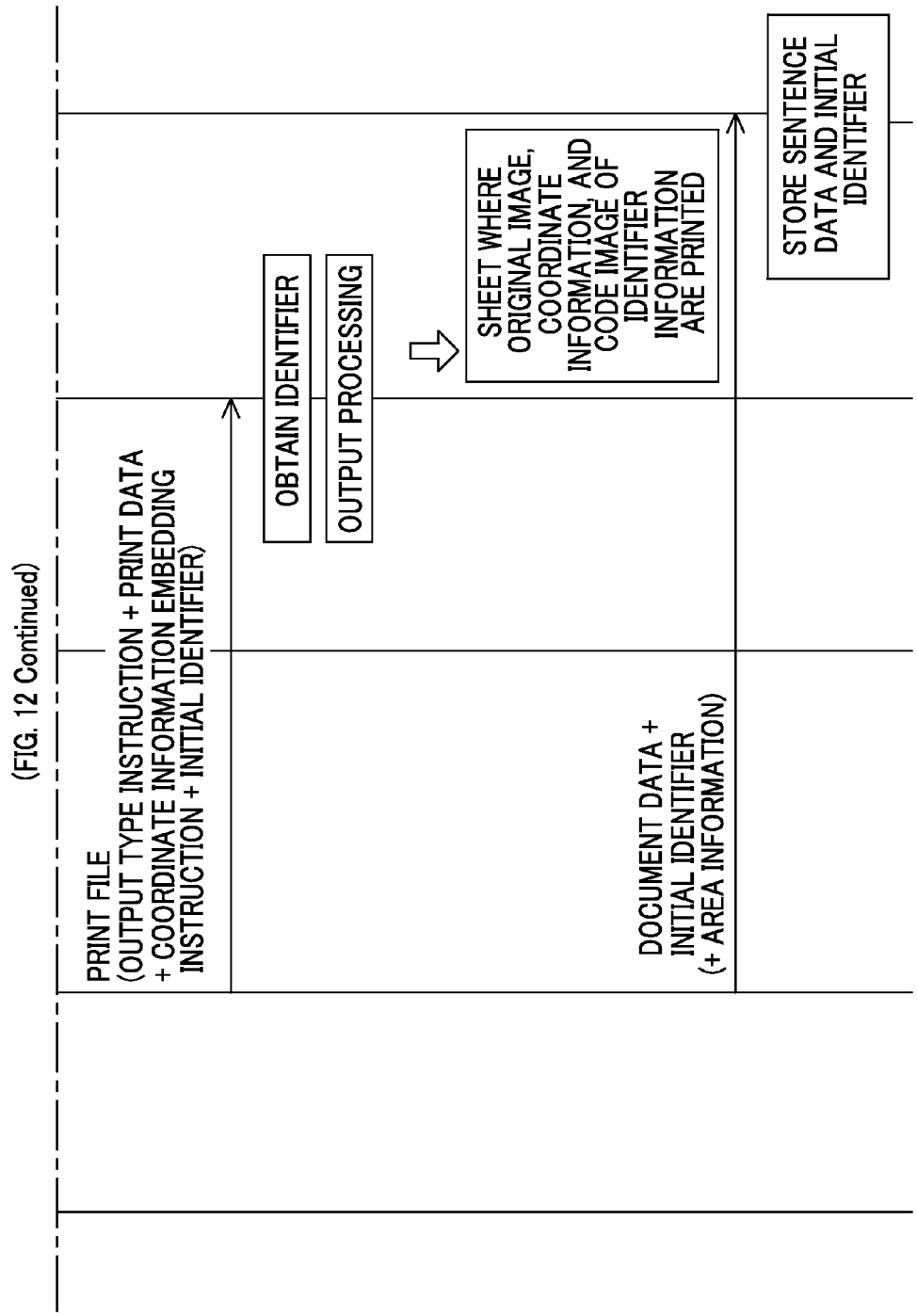

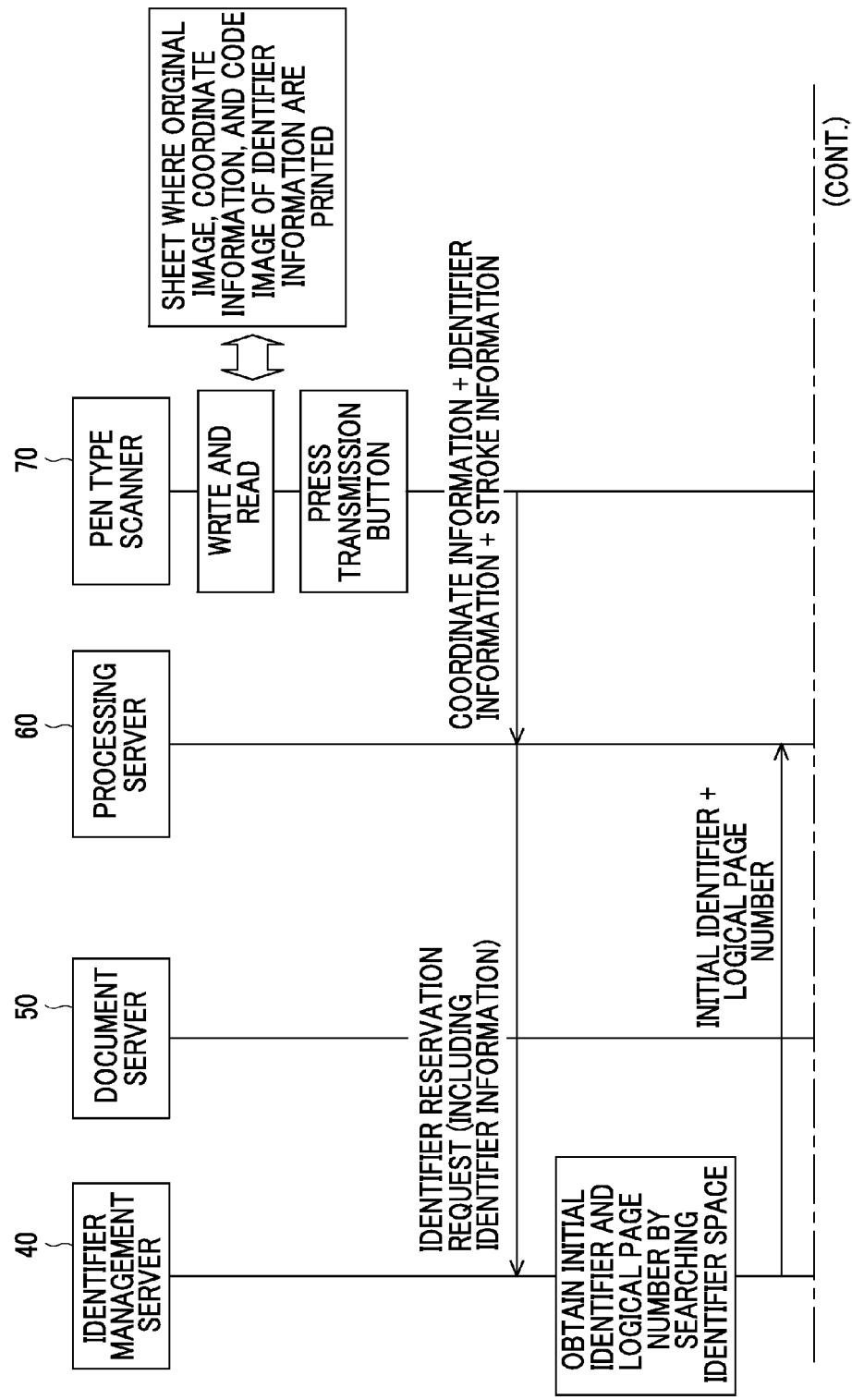

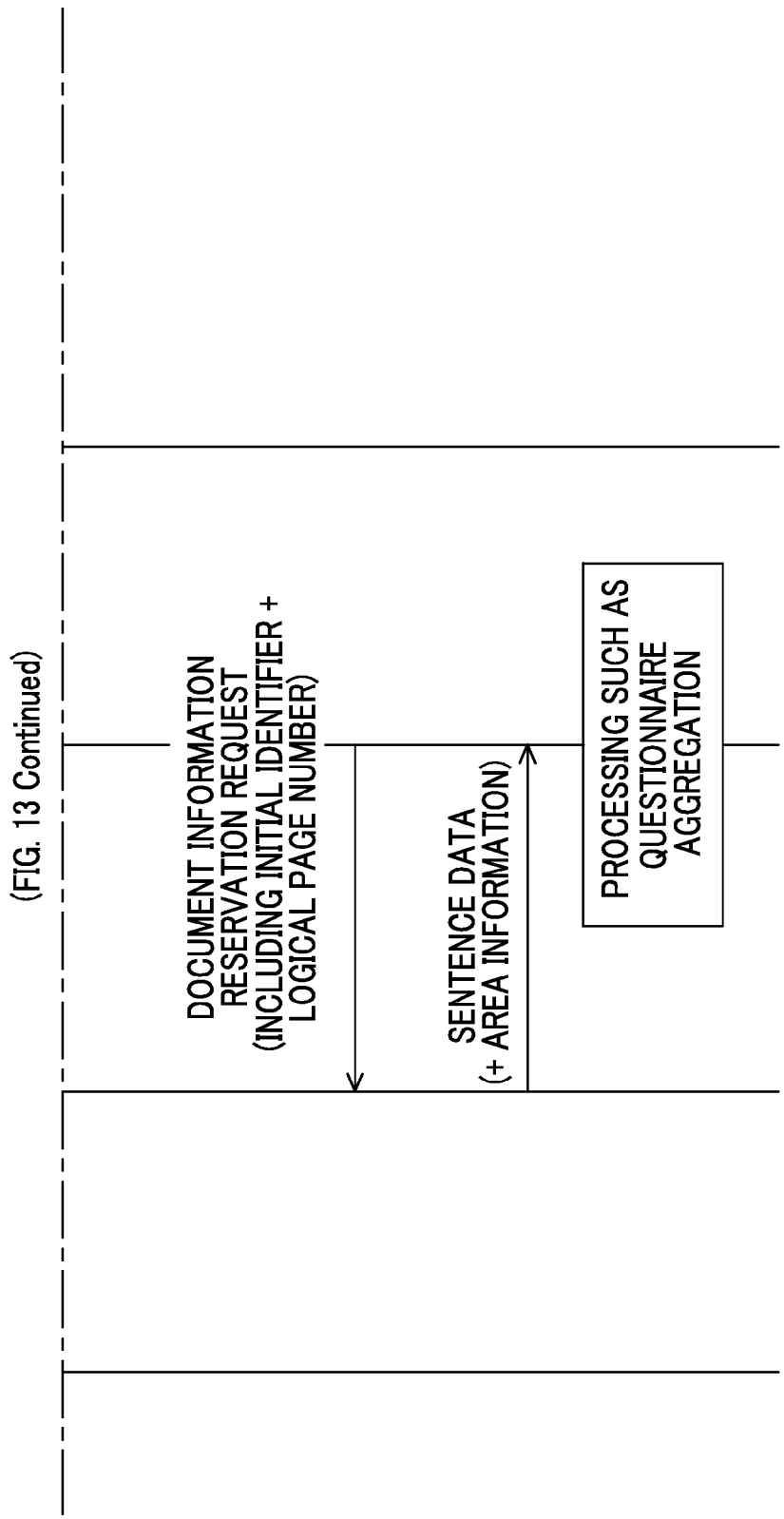

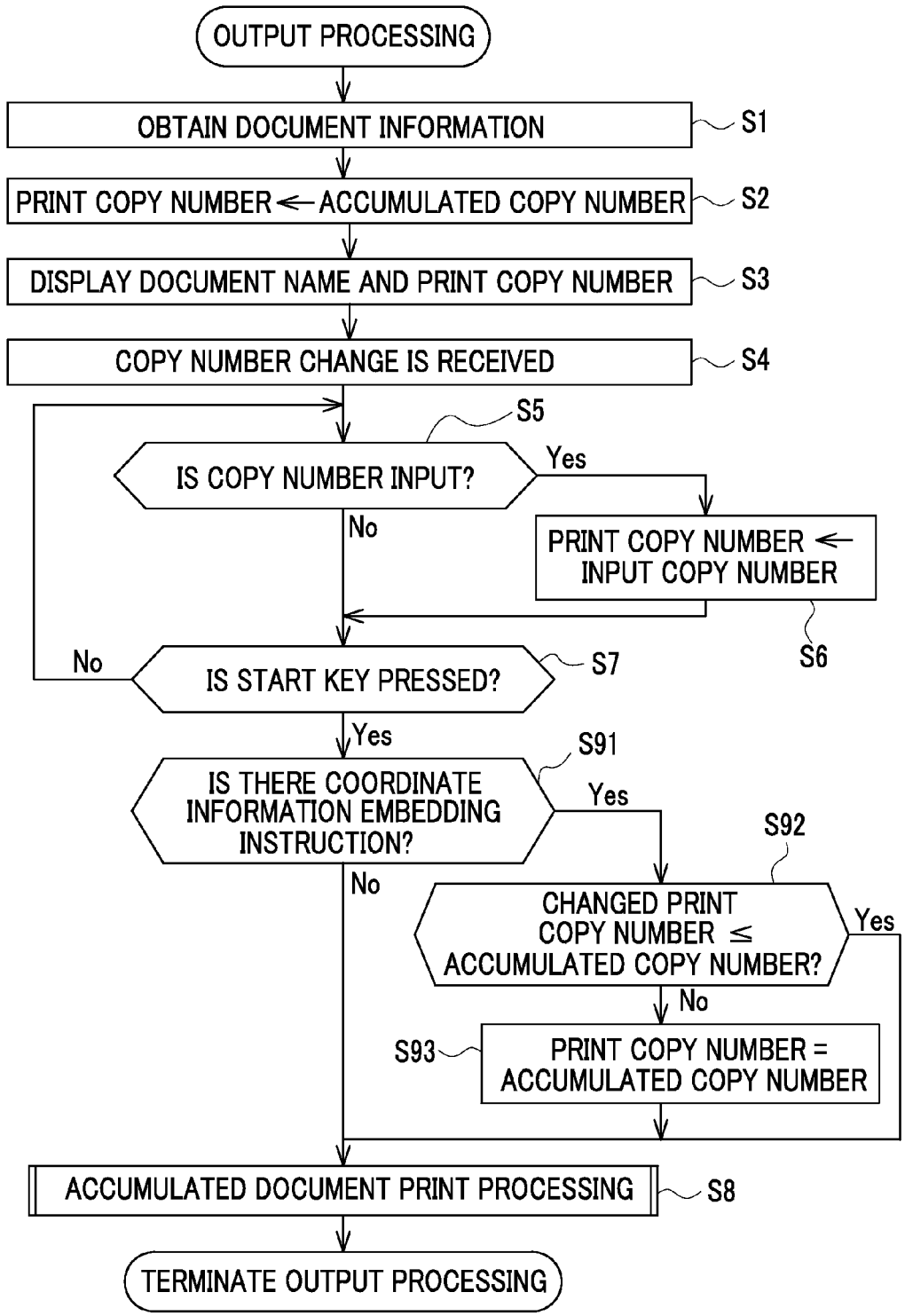

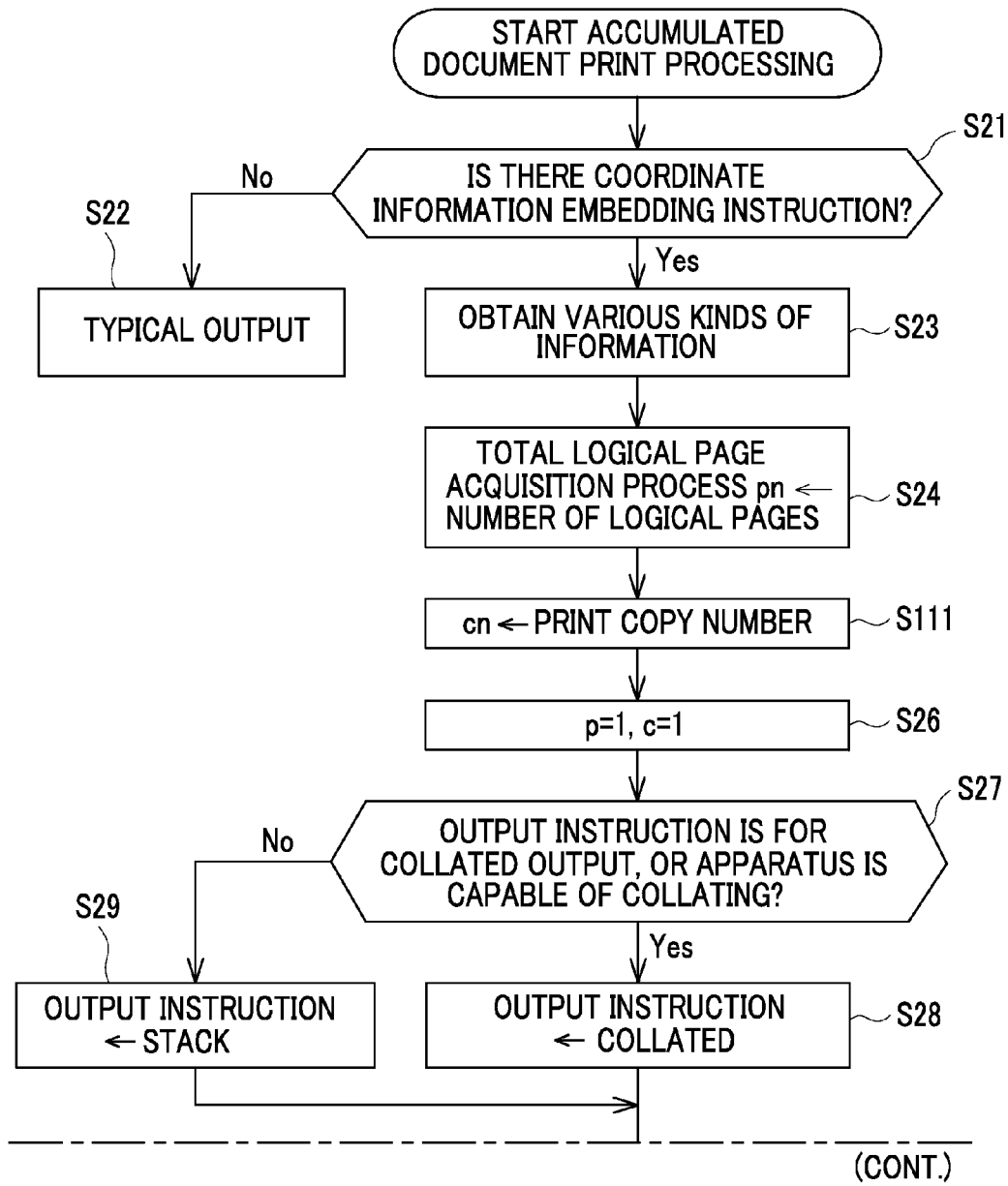

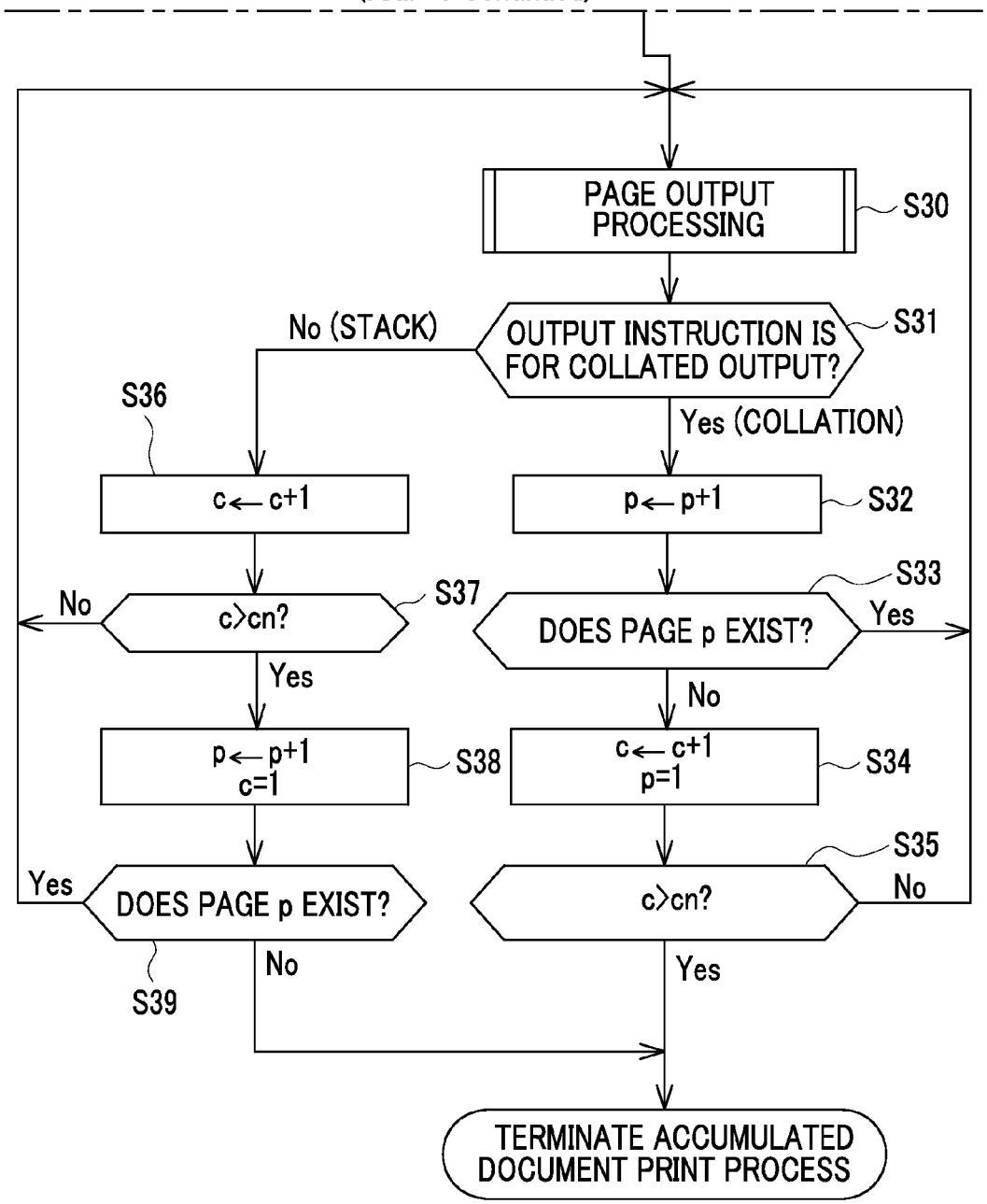

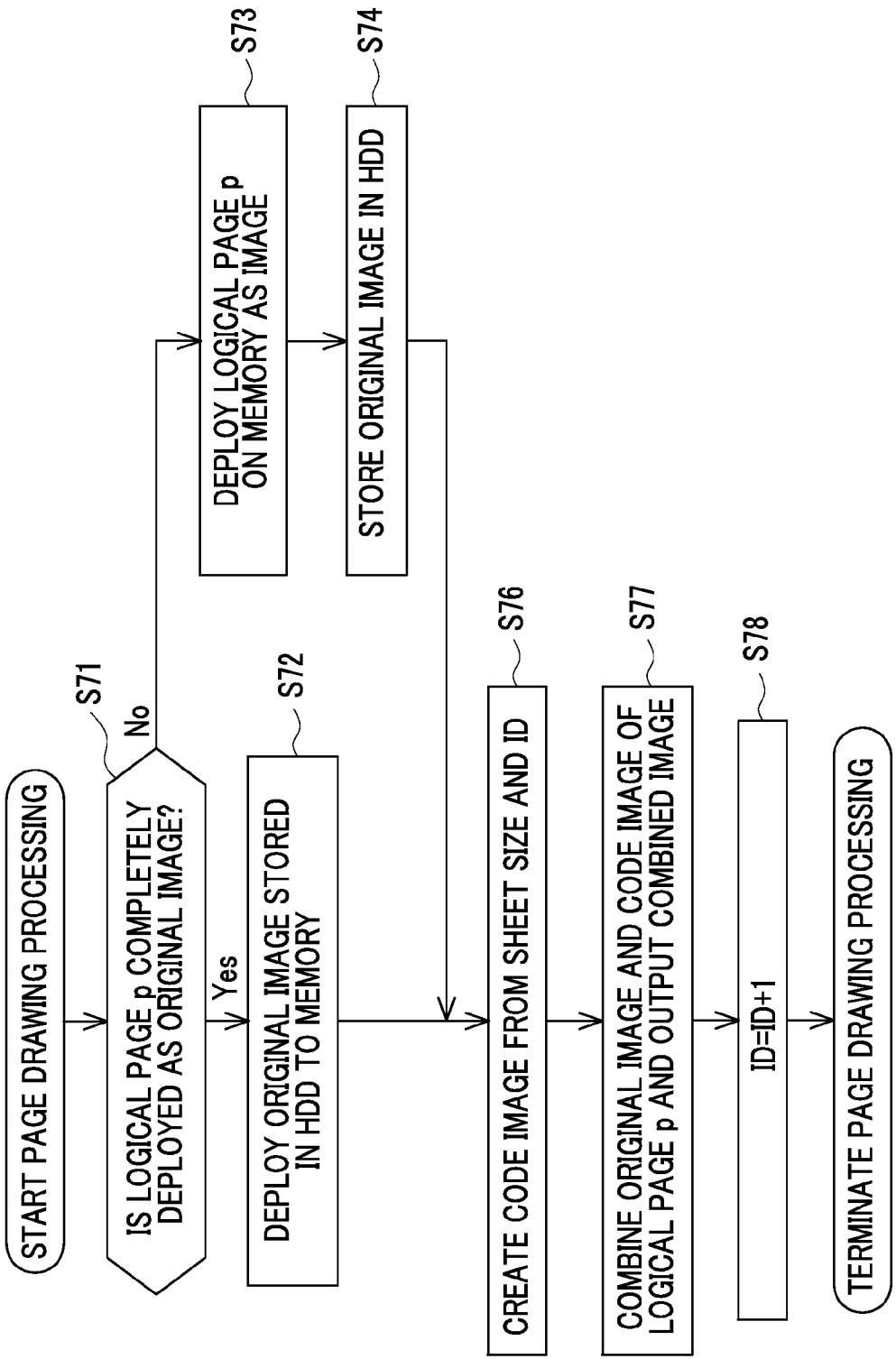

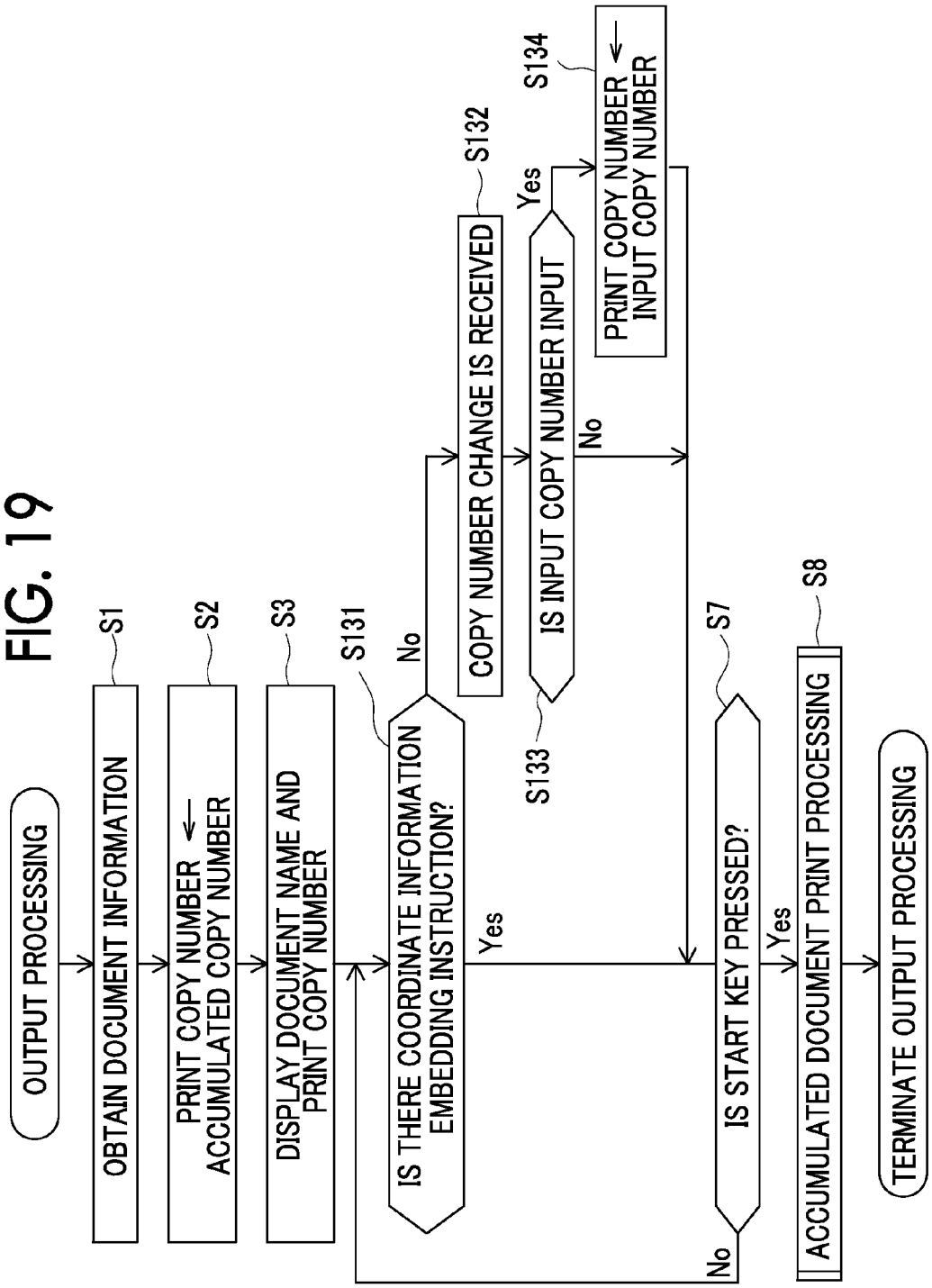

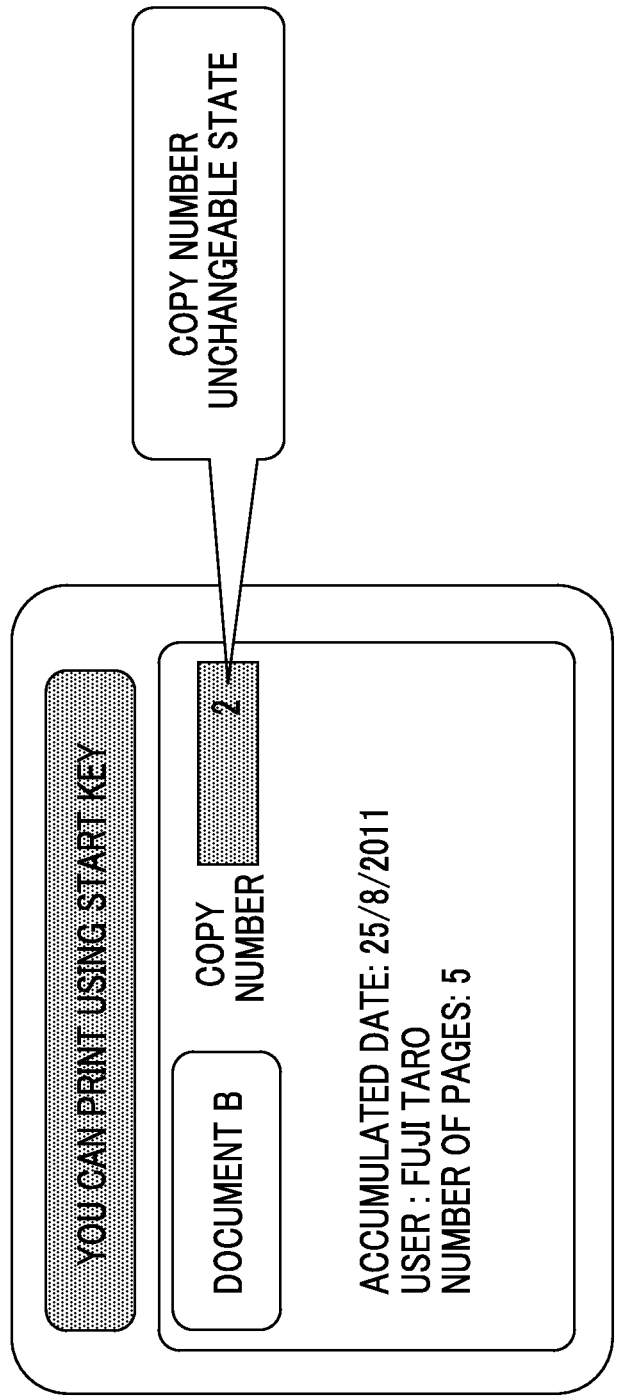

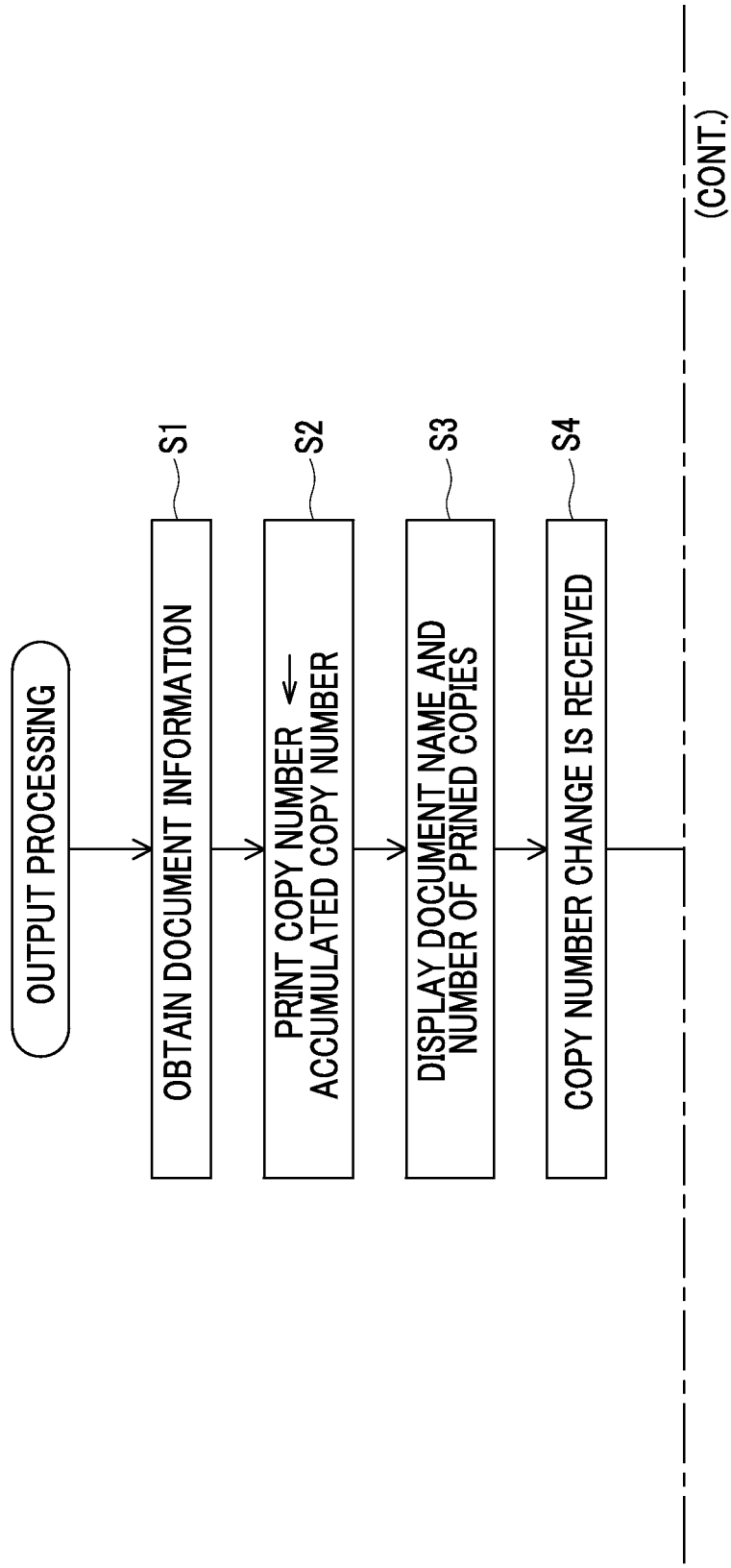

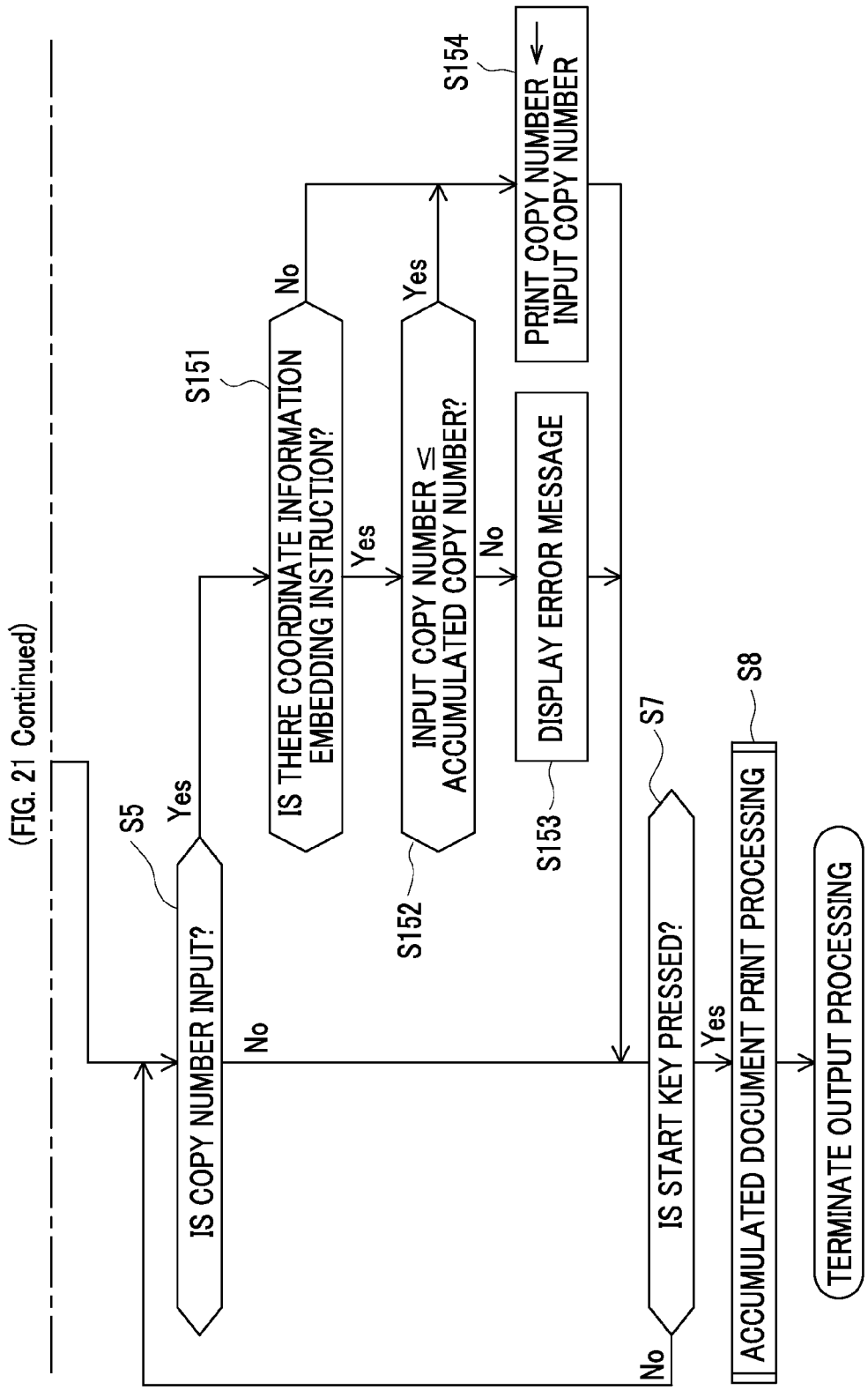

IMAGE FORMING APPARATUS, IMAGE FORMING SYSTEM, AND NON-TRANSITORY COMPUTER READABLE MEDIUM STORING CONTROL PROGRAM

CROSS-REFERENCE TO RELATED APPLICATIONS

This application is based on and claims priority under 35 USC 119 from Japanese Patent Application No. 2011-206036 filed Sep. 21, 2011.

BACKGROUND

Technical Field

The invention relates to an image forming apparatus, an image forming system, and a non-transitory computer readable medium storing a control program.

SUMMARY

According to an aspect of the invention, there is provided an image forming apparatus including:

an accumulation unit that accumulates image forming data for forming an image for each logical page and print copy number information for printing the image forming data;

an instruction unit that instructs print of the image forming data accumulated in the accumulation unit;

an output unit that outputs an image on a print medium based on the image forming data for which the instruction unit instructs the print and the print copy number information relating to the image forming data;

an identifier computing unit that manages an identifier group in accordance with the number of logical pages of the image forming data and the print copy number information, and computes a different identifier for each physical page output by the output unit based on an initial identifier provided in response to a print request from an external apparatus which provides the initial identifier out of the identifier group;

a combining unit that combines each identifier computed by the identifier computing unit with an image of each physical page output by the output unit; and a change unit that changes the print copy number information used by the output unit to output the image, wherein the combining unit does not perform the combining for an increased copy number of a physical page if the change unit increases the print copy number information.

BRIEF DESCRIPTION OF THE DRAWINGS

Exemplary embodiments of the present invention will be described in detail based on the following figures, wherein:

FIG. 10 is a flowchart illustrating an exemplary output processing on a physical-page basis;

FIG. 12 is a diagram illustrating a series of processing examples in the image processing system;

FIG. 13 is another diagram illustrating a series of processing examples in the image processing system;

FIG. 15 is a flowchart illustrating an exemplary output processing according to a second embodiment of the invention;

FIG. 16 is a flowchart illustrating an exemplary accumulated document print process according to a second embodiment of the invention;

FIG. 17 is a flowchart illustrating an exemplary page drawing processing according to a second embodiment of the invention;

FIG. 19 is a flowchart illustrating an exemplary output processing according to a third embodiment of the invention;

FIG. 20 is a diagram illustrating an exemplary manipulation unit where a selected document name, a print copy number, a storage date/time, and the like are displayed according to a third embodiment of the invention;

FIG. 21 is a flowchart illustrating an exemplary output processing according to a fourth embodiment of the invention.

DETAILED DESCRIPTION

Exemplary embodiments of the invention will be described with reference to the accompanying drawings.

First Exemplary Embodiment

First, a first exemplary embodiment will be described.

The first exemplary embodiment is an image processing system.

Figure 1:
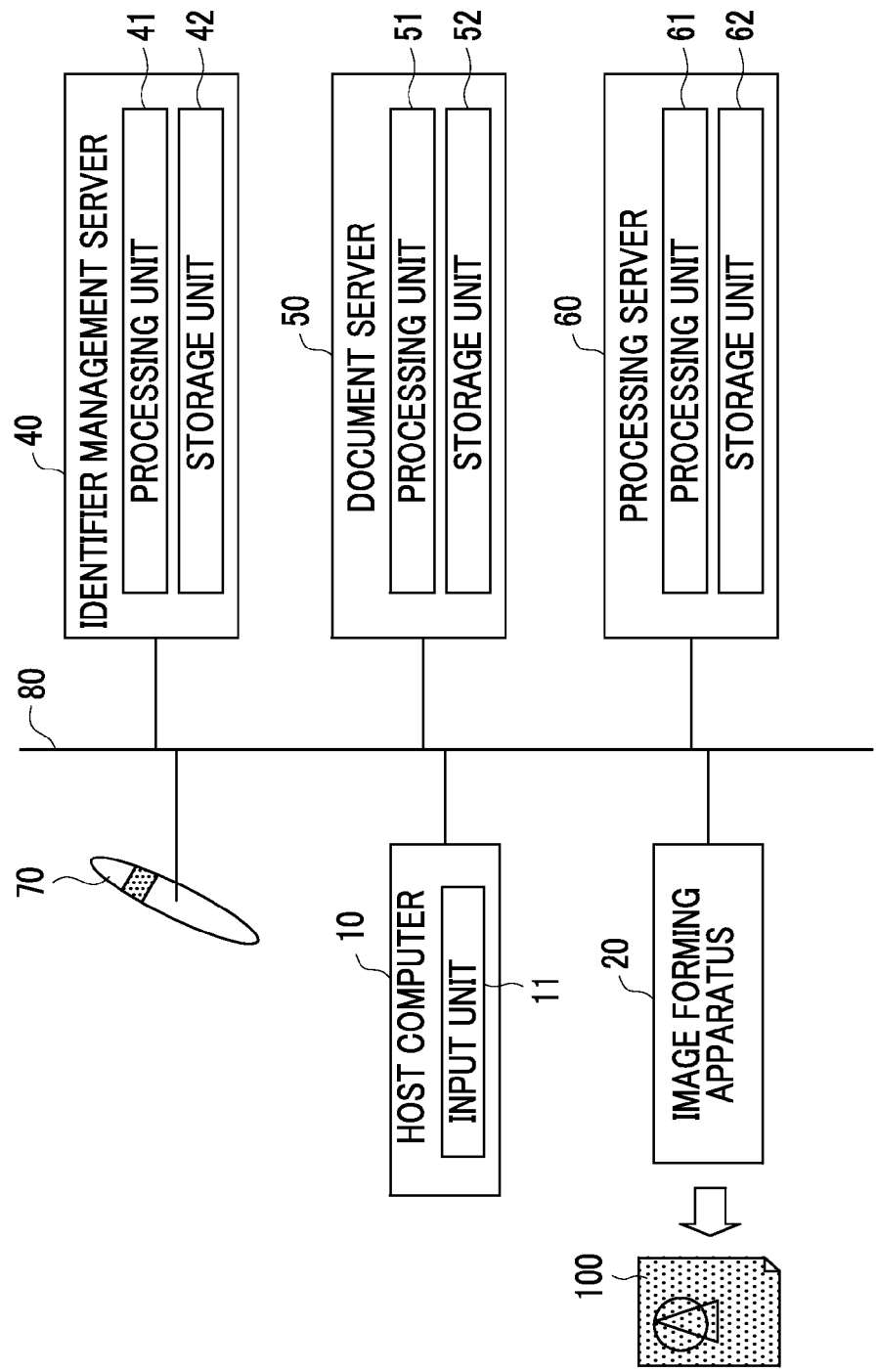
FIG. 1 is a block diagram illustrating a schematic configuration of an image processing system according to an exemplary embodiment of the invention.

FIG. 1 is a block diagram illustrating a schematic configuration of the image processing system 1 according to an exemplary embodiment of the invention.

As shown in FIG. 1, the image processing system 1 includes a host computer 10, an image forming apparatus 20, an identifier management server 40, a document server 50, a processing server 60, and a pen type scanner 70.

Here, the host computer 10, the image forming apparatus 20, the identifier management server 40, the document server 50, the processing server 60, and the pen type scanner 70 are communicably connected through a wired/wireless communication unit 80. For example, the communication unit 80 may include a local area network (LAN), Internet, or a public switched telephone network (PSTN).

The host computer 10 outputs a print request to the image forming apparatus 20 in order to print documents, graphics, and the like created or input by a user on a print medium.

For this reason, the host computer 10 is configured such that a user is allowed to set each item of the output type at the time of print using an input unit 11 (such as a keyboard, a mouse, and a touch panel).

Here, items of the output type may include a copy number (total output number), a housing unit for housing sheets, a discharge type (output type) of the printed sheets, a single-side/duplex print, a discharge destination of the printed sheets, a discharge sequence of the printed sheets, a staple function, and the like. For example, the discharge type of the printed sheets includes a collated output or stack output for outputting plural copies (hereinafter, referred to as a collated/stack output). In addition, the discharge destination of the printed sheet includes a mess discharge unit or a face-up tray in which the sheets are discharged while the printed side faces up.

Here, the "collated output" refers to a print type in which print is made for each print copy number (also referred to as an output copy number) indicating how many copies have been printed before the current page on a logical-page basis. In addition, the "stack output" refers to a print type in which print is made for each logical page on a print-copy-number basis.

In the host computer 10 having such a configuration, first, as a user instructs execution of the print by setting each item of such output types using the input unit 11, the printer driver (not shown) performs the software processing necessary for the print.

Here, the host computer 10 performs a software processing for the print target images (application data) or each item of the established output type for use in the image forming apparatus 20. Specifically, the host computer 10 performs a process of processing an image into the print data (output data) or a process of displacing each item of the established output type to the output type instruction read by the image forming apparatus 20 so that the image forming apparatus 20 can process them through the software processing.

Then, the host computer 10 creates a print file in which a single print request is made based on the print data and the output type instruction obtained by such a processing. The host computer 10 transmits the created print file to the image forming apparatus 20 through the communication unit 80.

The image forming apparatus 20 performs the image forming process based on the print file (print request) from the host computer 10.

Figure 2:
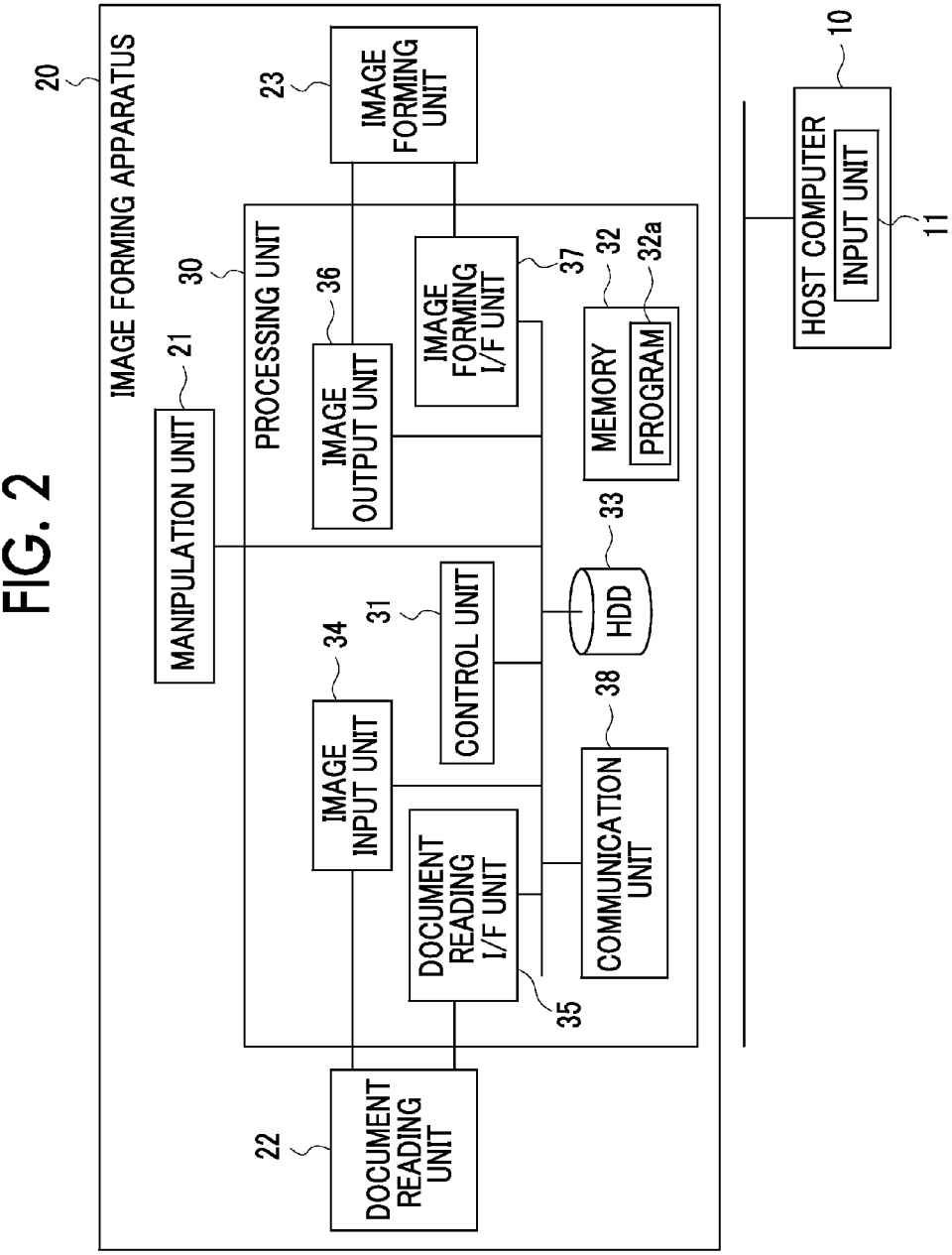
FIG. 2 is a block diagram illustrating an exemplary configuration of an image forming apparatus.

FIG. 2 is a diagram illustrating an exemplary configuration of the image forming apparatus 20.

As shown in FIG. 2, the image forming apparatus 20 includes a manipulation unit 21, a document reading unit 22, an image forming unit 23, and a processing unit 30.

The manipulation unit 21 is an information input/output unit. For example, the manipulation unit 21 is a manipulation panel and the like including a display unit for displaying information for a user and an input unit manipulated by a user to input an instruction content.

The processing unit 30 executes various processings in the image forming apparatus 20.

As shown in FIG. 2, the processing unit 30 includes a control unit 31, a memory 32, an HDD 33, an image input unit 34, a document reading I/F unit 35, an image output unit 36, an image forming I/F unit 37, and a communication unit 38.

The control unit 31 performs a variety of controls. For example, the control unit 31 controls the image forming I/F unit 37 to output the original image of the image output unit 36 to the image forming unit 23 and form the image on a sheet in the image forming unit 23 by executing the print request. In addition, the control unit 31 controls the document reading I/F unit 35 and the image forming I/F unit 37 to store the original image of the document read by the document reading unit 22 in the image input unit 34, outputs the original image stored in the image input unit 34 to the image output unit 36, and forms the image on the sheet in the image forming unit 23 by executing a replication request.

The memory 32 and the HDD 33 store data or information necessary in a variety of processings. For example, the memory 32 stores a program 32a or data used by the control unit 31.

For example, the program 32a may be initially stored in the memory 32 at the time of shipment of the image forming apparatus 20. In addition, the program 32a may be read from the storage medium such as a CD-ROM and stored in the memory 32 through user's operation and the like after the shipment.

The communication unit 38 communicates with the host computer 10. When the print file is received by the communication unit 38, the image forming apparatus 20 notifies the control unit 31 of this fact using an interrupt processing and the like.

As the notification of the fact that the print file is received from the communication unit 38, the control unit 31 analyzes the content of the print file while or after storing the print file in the memory 32 or HDD 33. As the result of the analysis, it is determined that the file is for forming an image, the control unit 31 generates a print control command used as a unit of the internal processing and executes the generated print control command. That is, the control unit 31 reads the print data from the print file and deploys the read print data as the original image on the memory 32 using an imaging program.

In addition, the control unit 31 reads the output type instruction (output type information) from the print file and specifies the output type such as which feeder unit is used for the image forming unit 23, single-sided/duplex print, and whether or not stapling is performed depending on the content of the read output type instruction.

Then, the control unit 31 sequentially outputs the original image determined according to the processing of the image forming unit 23 (determination on which original image is used).

Here, if the print copy number is specified as plural copies in the output type instruction, the image forming apparatus 20 performs the output processing as follows.

If the number of pages is greater than a predetermined setting value (for example, memory capacity) in a case where plural copies are printed using the collated output, the control unit 31 temporarily stores the original image deployed on the memory 32 in the HDD 33 because the images of several print pages may not be deployed on the memory 32. As a result, the control unit 31 deploys the original image read from the HDD 33 onto the memory 32 as necessary and transmits the original image to the image forming unit 23. In this manner, in the case of the collated output, the image forming apparatus 20 collectively prints as many images as the copy number in the order of logical pages such as 1, 2, 3, 4, . . . , 1, 2, 3, 4, . . . .

If plural copies are printed using the stack output, the same image may be sequentially printed for as many as the copy number. Therefore, the control unit 31 deploys the original image on the memory 32 and transmits the deployed original image to the image forming unit 23 for as many as the copy number. In this manner, if three copies are printed, the image forming apparatus 20 prints as many images as each copy number from an initial page of the logical page such as 1, 1, 1, 2, 2, 2, 3, 3, 3, . . . .

In this manner, the image forming apparatus 20 can obtain a printed material according to the output type instruction set in the host computer 10.

In addition, the image forming apparatus 20 includes an accumulated document print function for accumulatively outputting the print data. In the accumulated document print, the image forming apparatus 20 temporarily stores the print data (or the processed print data as necessary) transmitted from the host computer 10 in the storage unit such as HDD 33 along with information necessary for the print such as a print copy number. When the print is instructed from a user, the image forming apparatus 20 actually performs print based on the print data, print copy number (accumulated print copy number), or the like. That is, in the accumulated document print, the image forming apparatus 20 waits for the print instruction from a user to the image forming apparatus 20 and performs the print without performing the print when the print file is received from the host computer 10.

For example, using such an accumulated document print function, it is possible to prevent a so-called derelict print generated when a user does not take the sheets printed in the image forming apparatus 10 side even when a user issues a print instruction in the host computer 10 side.

In recent years, a system has been proposed, in which coordinate information as a location code is embedded on a print face of the sheet, and a location on the sheet is specified by reading the location code. For example, there is a system in which the location code embedded on the print face is read by a pen type scanner, and the pen type scanner transmits the reading result and information on strokes written on the sheet to a server and the like.

In such a system, only information (location information or stroke information) obtained by the pen type scanner is transmitted to the server and the like, and the server and the like which receives the information may respond with a text on an original questionnaire sheet. Therefore, it is possible to determine the mark position (check position) on the questionnaire sheet without recovering the questionnaire sheet. Therefore, such a system has high convenience because electronic data can be created from paper.

In this regard, conventionally, a technique of embedding the coordinate information (position information) at the time of the image formation is disclosed. Conventionally, an embedding technique in a so-called on-demand print is disclosed, in which a document having embedded coordinate information is output using a printer and the like instead of a printing machine.

In order to construct such a system, it is necessary to provide a structure capable of distinguishing a printed material necessary to collect information because it is difficult to distinguish whether the coordinate information is written to a printed material necessary to collect information or a printed material not necessary to collect information only using the coordinate information. In addition, only using the coordinate information, it is difficult to know a matching relationship regarding which document and which page the (physical) page read from the pen belongs to and also difficult to process the page.

In this regard, there is known a method of adding (combining) identifiable information (for example, code image) to each physical page in the host computer side. In this case, the host computer transmits different image data for each physical page to the image forming apparatus.

However, in this method, if a hundred copies are printed based on the print data of a single page, the host computer is necessary to create image data of a hundred of pages as the physical page and transmit the created image data to the image forming apparatus. In this case, since the burden on the host computer for creating the image data of a hundred pages increases, a user is hindered in performing other processing using the host computer. In addition, the burden on the communication unit for communicating the image data of a hundred pages also increases.

As a method of preventing such a phenomenon, there is known a method of transmitting a single page of text from the host computer to the image forming apparatus, creating as many identifiers (for example, code images) as the print copy number using the image forming apparatus, and combining the identifiers with images of each physical page. In this case, it is envisaged that the space of the identifiers reserved based on the print copy number set by a user in the host computer and the logical pages of the print data is managed by a server which manages the identifiers or the host computer. Furthermore, in this case, it is envisaged that the image forming apparatus creates as many identifiers as the number of physical pages and combines the created identifiers with the images of each physical page based on the initial value (the minimum value of the identifier space including a numerical value group) of the identifier of the identifier space managed by the host computer or the server.

In this manner, since the image forming apparatus creates as many identifiers (for example, code images) as the print copy number and combines the identifiers with images of each physical page, it is possible to reduce the burden on the host computer and the communication unit.

Here, the image forming apparatus includes the accumulated document print function as described above. Using such an accumulated document print function, a user can obtain a printed material by specifying the print data (hereinafter, referred to as accumulated print data) accumulated in the image forming apparatus and instructing the print again. In addition, the image forming apparatus includes a unit (print copy number changeable unit) capable of instructing the print copy number different from the print copy number specified by the host computer when the print is performed through the accumulated document print function. For example, as a result, a user can instruct as many prints as the print copy number depending on various conditions (various reasons such as a change of the number of distribution destinations) changed until the print based on the accumulated print data is performed.

However, if the print copy number is changed in a configuration for combining identifiers with each physical page printed through the accumulated print data, a mismatching may occur since the identifier space is already reserved based on the print copy number.

For example, if the host computer instructs to print two copies of the document having three logical pages, the image forming apparatus assigns 6 numbers:

$$1,2,3,4,5,6 \qquad (1),$$

as the identifier information (in this example, the initial identifier is set to 1) to each physical page (3×2 physical pages).

In addition, if the print copy number is changed, the image forming apparatus assigns 9 numbers:

$$1,2,3,4,5,6,7,8,9 \qquad (2),$$

as the identifier information to each physical page (3×3 physical pages) based on the initial identifier (in this case, set to 1).

In this case, since the host computer or the server for managing the identifier space is not allowed to recognize that the print copy number is changed by the image forming apparatus, an identifier space including identifiers not used in the previous identifier space (in this example, 1, 2, 3, 4, 5, and 6) is reserved as the identifier space allocated to the next print data. For example, if the host computer instructs to print three copies of a document having two logical pages, the host computer or the server reserves identifier space (for example, 7, 8, 9, 10, 11, and 12) including the identifier number of 2×3 subsequent to the identifier space (in this example, 1, 2, 3, 4, 5, and 6) already reserved in advance. The image forming apparatus assigns 6 numbers as the identifier information to each physical page (2×3 physical pages) based on the initial identifier (in this example, 7) of that identifier space. As a result, the image forming apparatus assigns, for example, 6 numbers including:

$$7,8,9,10,11,12 \qquad (3)$$

as the identifier information to each physical page (2×3 physical pages).

However, comparing the value of (2) and the value of (3), identifiers 7, 8, and 9 are overlapped. That is, the identifier managed by the host computer or the server is allocated to each of two different physical pages. In this case, although the unit (for example, the processing server and the like) for processing the physical page based on the assigned identifier processes the physical pages relating to the (2) described above for the physical pages to which the identifier 7, 8, and 9 are assigned, it recognizes that the physical pages relating to the (3) described above are processed. Therefore, a mismatching between the physical page and the identifier occurs.

In this regard, according to an exemplary embodiment of the invention, the mismatching between the physical page and the identifier is prevented by changing the print copy number in the image forming apparatus side using the configuration and the processing described below.

That is, according to an exemplary embodiment of the invention, as a user instructs to execute the print (output setting) and the coordinate information embedding, the host computer 10 considers that instruction as an instruction to collectively embed both the coordinate information and the identifier information to a printed material, and causes the printer driver to execute the processing necessary in the corresponding print.

At this time, the host computer 10 transmits the identifier reservation request (also referred to as a number request or an identifier issuing request) to the identifier management server 40 through the communication unit 80. Here, the identifier reservation request includes the logical page number (number of logical pages) of the print data and the print copy number set by a user using the host computer 10. This identifier reservation request is a request for the identifier management server 40 to obtain the initial identifier (first identifier described below (initial identifier value)).

Then, as the initial identifier information is received from the identifier management server 40 corresponding to the identifier reservation request, the host computer 10 creates a single print file based on the aforementioned print data, the output type instruction, the coordinate information embedding instruction, and the initial identifier information. Here, the host computer 10 creates the print file by processing the print data, the output type instruction, the coordinate information embedding instruction, and the initial identifier information as necessary. In addition, the host computer 10 transmits the created print file to the image forming apparatus 20 through the communication unit 80.

In addition, the host computer 10 transmits, to the document server 50, the document data (for example, all or part of the text to be printed) used to create the print data transmitted to the image forming apparatus 20 along with the initial identifier information.

The identifier management server 40 is a server for collectively managing the identifiers in the entire system. For example, the identifier management server 40 includes a processing unit 41 and a storage unit 42 as shown in FIG. 1.

First, as the identifier reservation request is received from the host computer 10, the identifier management server 40 searches the identifier space unoccupied within the identifier space (identifier group) managed by the storage unit 42 using the processing unit 41. Here, the identifier space includes plural identifiers (plural numeric values), and the unoccupied identifier space is an identifier space including the identifier currently not being used (not yet allocated).

Specifically, the identifier management server 40 searches the identifier space (space of continuous numeric values) unoccupied by a size obtained by multiplying the print copy number by the number of logical pages (print copy number× number of logical pages). For example, if the number of the logical pages is set to 5, and the print copy number is set to 3, the identifier management server 40 searches the identifier space including 15(=5×3) unoccupied identifiers corresponding to the number of printed physical pages.

Then, as the unoccupied identifier space, that is, the identifier space which may be allocated to the image forming apparatus 20 is searched and reserved, the identifier management server 40 stores the obtained identifier space, the initial identifier information which is the leading identifier (the minimum number of identifiers), information on the number of logical pages, and information on the print copy number in the storage unit 42.

The identifier management server 40 transmits the initial identifier information to the host computer 10 out of the information stored in the storage unit 42.

In addition, as the identifier reservation request described below is received by the processing server 60, the identifier management server 40 returns the corresponding initial identifier information and the information on the logical page number based on the identifier information included in the identifier reservation request. Here, the identifier management server 40 uses the identifier information, the initial identifier information, and the number of the logical pages corresponding to the initial identifier information to obtain the logical page number corresponding to the identifier information included in the identifier reservation request through a predetermined operation.

The document server (print data server) 50 is a server that manages the document data. For example, the document server 50 includes a processing unit 51 and a storage unit 52 as shown in FIG. 1.

As the document data and the initial identifier information are received from the host computer 10, the document server 50 stores the document data and the initial identifier information in the storage unit 52 using the processing unit 51 by associating them with each other.

Here, a user may collectively store the information (area information) on which information is written to the area which is for each logical page in the document server 50. In this configuration, as a user inputs information on items to be written and information on a specific coordinate area, the host computer 10 transmits the area information including such information along with the text data to the document server 50. In addition, as the text data and the area information are received, the document server 50 stores the document data and the area information by associating each other.

Then, as the document information reservation request described below is received by the processing server 60, the document server 50 searches and obtains the document data (such as document information corresponding to the logical page number) based on the initial identifier and the logical page number included in the document information reservation request. In addition, the document server 50 responds to the processing server 60 based on the obtained document data (such as document information and image information) and the area information if the area information is stored.

If the print file is received from the host computer 10, and the coordinate information embedding instruction is embedded in the received print file, the image forming apparatus 20 reads the initial identifier information from the print file and stores the initial identifier information in the memory 32. Furthermore, the control unit 31 reads the print data from the print file and stores the print data in the HDD 33. The control unit 31 image-deploys the print data on the memory 32 as the print processing. In addition, the control unit 31 creates the coordinate information image for each physical page through the print processing.

Here, the control unit 31 performs the processing for creating the coordinate information image for each physical page as follows.

First, the control unit 31 initializes the first identifier assigned to the initially output physical page using the initial identifier given by the instruction of the print file (print request). The control unit 31 sets the first one of identifiers assigned to the initially printed physical page the initial identifier through this initialization.

The control unit 31 generates the identifier for each physical page based on the first identifier set through the initialization whenever the page drawing processing of the physical page is performed. For example, the control unit 31 generates the identifier for each physical page by setting the first identifier to the initial value and incrementing it one by one. In addition, needless to say, an exemplary embodiment of the invention is not limited to such a method of generating the identifier.

Meanwhile, the control unit 31 generates the coordinate information image matching with the sheet size of the sheet to be printed. Here, the coordinate information image is configured by the coordinate information, and, for example, is generated by a coordinate information image generating program. In addition, the control unit 31 transmits the identifier information previously obtained for the coordinate information image generating program as a parameter to generate the coordinate information image (coordinate information image obtained by combining the identifier information) including the identifier information. In addition, the control unit 31 creates such a coordinate information image on the memory 32 for each physical page.

The control unit 31 performs the processing for forming an image on the sheet by combining the coordinate information image and the original image based on the print data.

Here, the image output unit 36 is capable of combining the images stored in plural memories through OR or XOR operation using the image combining function and outputting the result to the image forming unit 23. For this reason, the control unit 31 instructs the image output unit 36 to output the combined image by specifying the original image deployed on the memory and the coordinate information image (coordinate information image including identifier information) created for the physical page used to form that original image. As a result, the image output unit 36 outputs the signal of the combined image to the image forming unit 23.

If the signal is input from the image output unit 36, the image forming unit 23 forms the image on the sheet based on that signal. In this manner, the image formed on the sheet using the image forming unit 23 is an image in which the code image obtained by encoding the coordinate information and identifier information is combined with the original image.

The pen type scanner 70 is configured to write description content on the sheet using a pen function and read the description content on the sheet using the scanner function at the same time.

Figure 3:
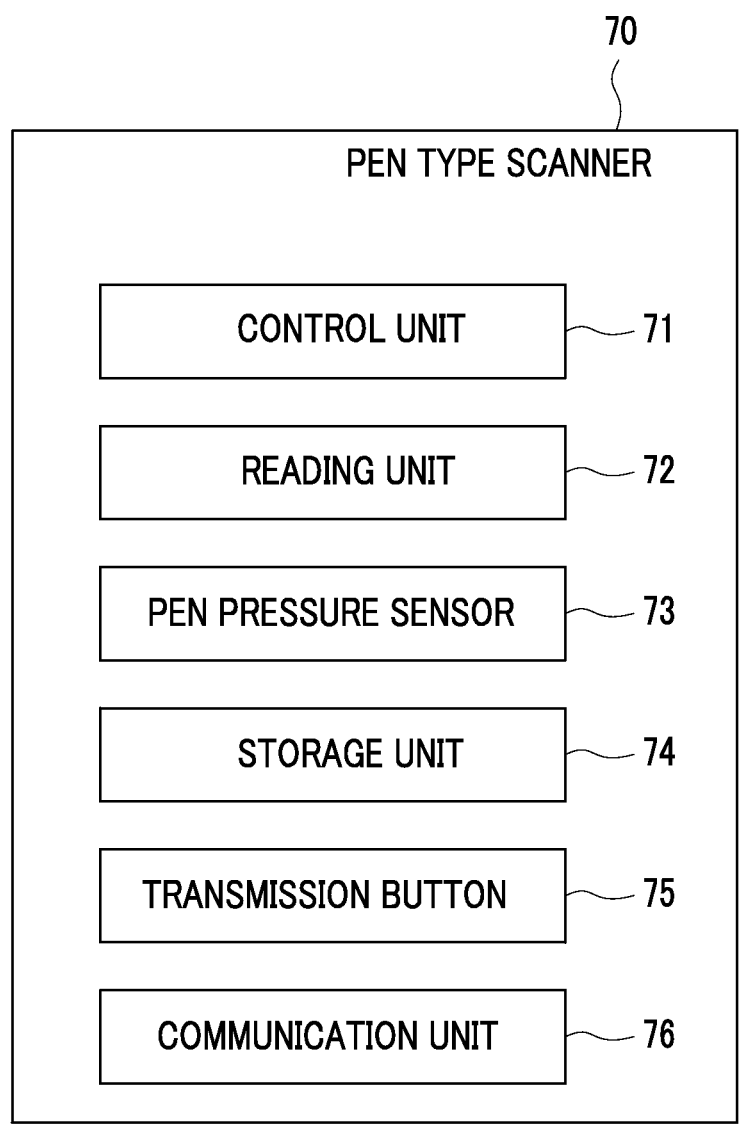
FIG. 3 is a block diagram illustrating an exemplary configuration of a pen type scanner.

FIG. 3 is a block diagram illustrating an exemplary configuration of a pen type scanner 70.

As shown in FIG. 3, the pen type scanner 70 includes a control unit 71, a reading unit 72, a pen pressure sensor 73, a transmission button 74, and a communication unit 75.

The pen type scanner 70 is controlled by the control unit 71 such that the reading unit 72 reads the description content within the readable range on the sheet as the pen pressure sensor 73 detects a pen pressure (for example, a pen pressure equal to or higher than a predetermined value is detected). As the transmission button 74 is pressed, the pen type scanner 70 transmits the read information to processing server 60 through the communication unit 75.

For example, when the code images of the coordinate information and identifier information are written to the printed sheet 100, the pen type scanner 70 having such a configuration performs the processing as follows.

In the pen type scanner 70, as the reading unit 72 reads the code image on the print surface, the control unit 71 (using the recognition function thereof) reads the coordinate information and the identifier information from the code image. In the pen type scanner 70, as the transmission button 74 is pressed, such information is transmitted to a predetermined specific processing server 60 through the communication unit 75. In addition, if the writing is performed using the pen type scanner 70, the control unit 71 also collects the written stroke information and also transmits the stroke information to the processing server 60.

The processing server 60 performs the processing based on the information transmitted from the pen type scanner 70. For example, as shown in FIG. 1, the processing server 60 includes a processing unit 61 and a storage unit 62. First, if information is transmitted from the pen type scanner 70, the processing server 60 extracts the identifier information from that information. In addition, the processing server 60 transmits the identifier reservation request to the identifier management server 40 using the extracted identifier information. Here, the identifier reservation request is a request for obtaining the logical page number. This identifier reservation request includes the identifier information.

If the initial identifier and the information on the logical page number are received from the identifier management server 40 in response to the identifier reservation request, the processing server 60 transmits the document information reservation request to the document server 50. Here, the document information reservation request is a request for obtaining the document data (document information corresponding to the logical page number and the like) corresponding to that physical page number. This document information reservation request includes the received initial identifier and logical page number.

If the text data (in some cases, including the area information) are transmitted from the document server 50 in response to the document information obtaining request, the processing server 60 performs a predetermined processing based on the text data, the stroke information, and the coordinate information transmitted from the pen type scanner 70 in advance. For example, if the print data is for a questionnaire sheet, the processing server 60 performs a process of aggregating the questionnaires.

Next, a processing performed when the accumulated document is printed by the image forming apparatus 20 will be described in more detail.

Figure 4:
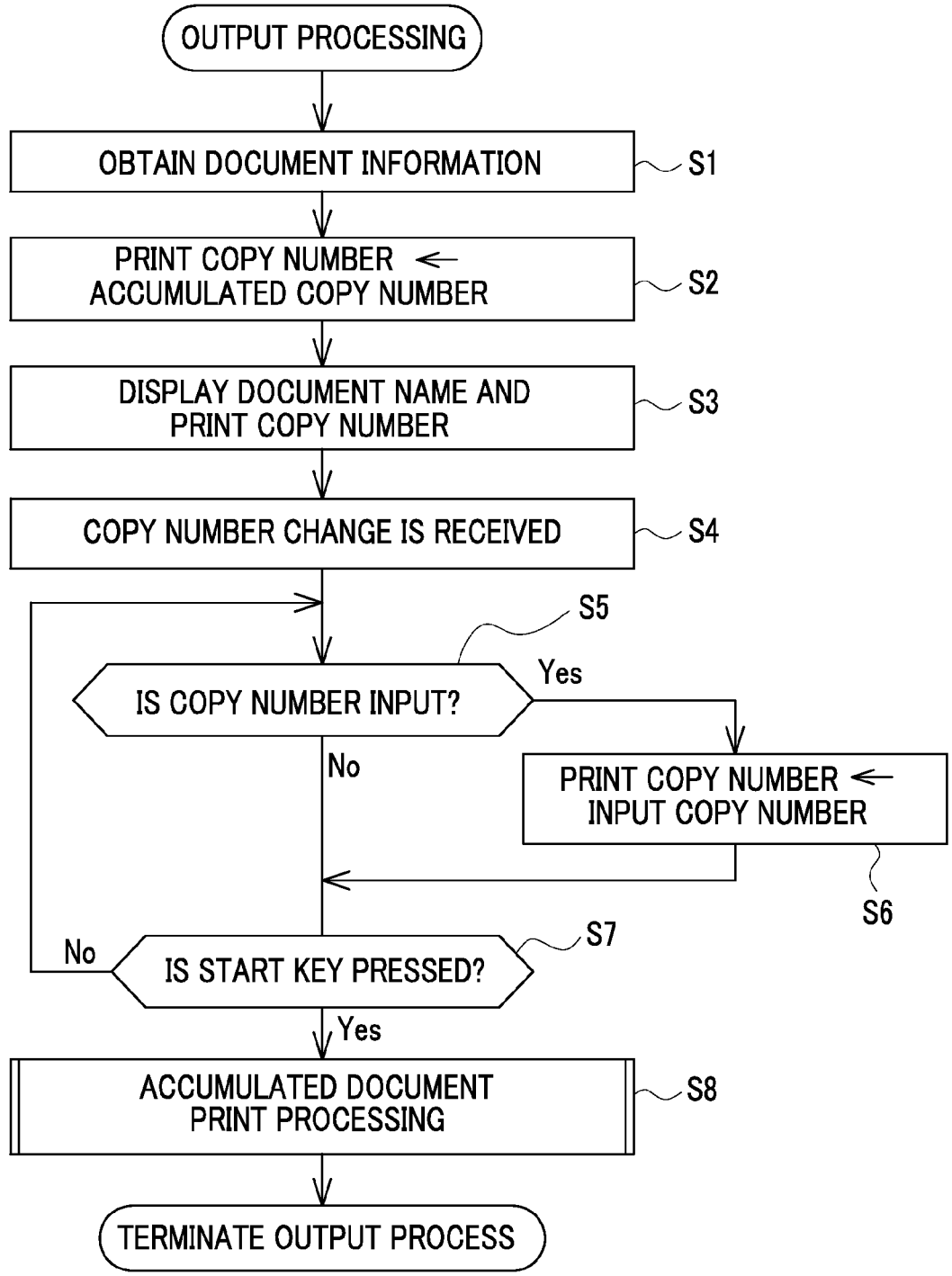
FIG. 4 is a flowchart illustrating an exemplary output process.

FIG. 4 is a flowchart illustrating an output processing according to an exemplary processing order.

Figure 5:
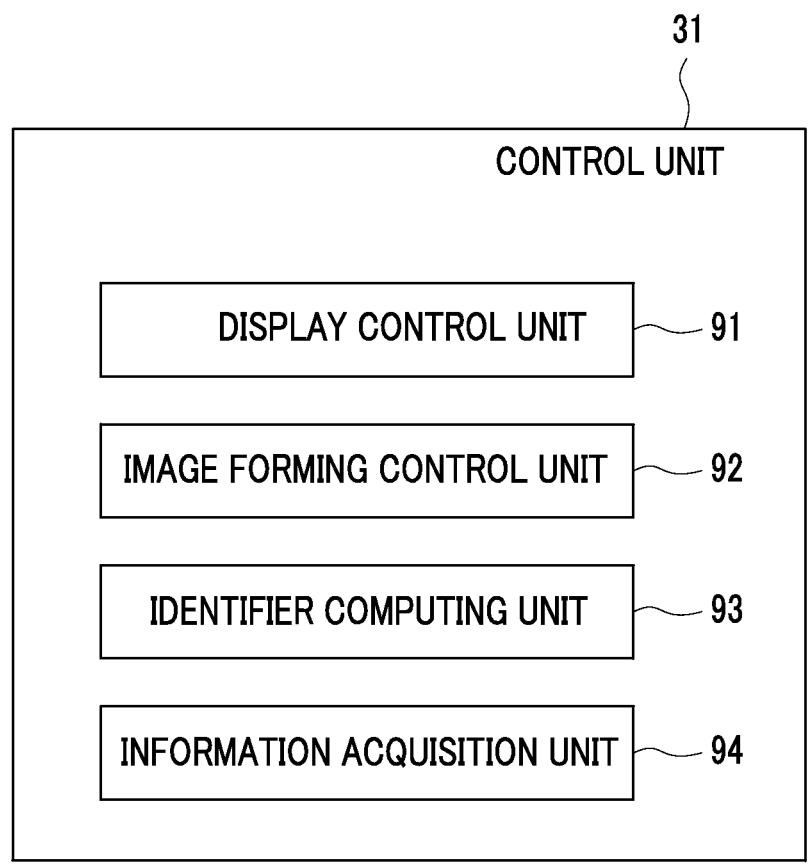
FIG. 5 is a block diagram illustrating an exemplary configuration of a controller.

FIG. 5 is a diagram illustrating a configuration example of the control unit 31 of the processing unit 30 in the image forming apparatus 20 which executes the processing of FIG. 4. As shown in FIG. 5, the control unit 31 includes a display control unit 91, an image forming control unit 92, an identifier computing unit 93, and an information acquisition unit 94.

As shown in FIG. 4, first, in step S1, the display control unit 91 obtains the information on documents necessary in the subsequent processing. For example, the display control unit 91 obtains the document name relating to the print data, the accumulated copy number (the print copy number initially stored for the accumulated document print), the date/time of storing the print data, and the like.

Then, in step S2, the display control unit 91 sets the print copy number to the accumulated copy number (the print copy number initially stored for the accumulated document print) obtained in step S1.

Then, in step S3, the display control unit 91 displays the document name obtained in step S1 and the print copy number set in step S2 on the manipulation unit 21 (for example, a manipulation panel). At this time, the display control unit 91 depending on the next step S4 displays the print copy number on the manipulation unit 21 as the change receiving state (changeable state).

Figure 6:
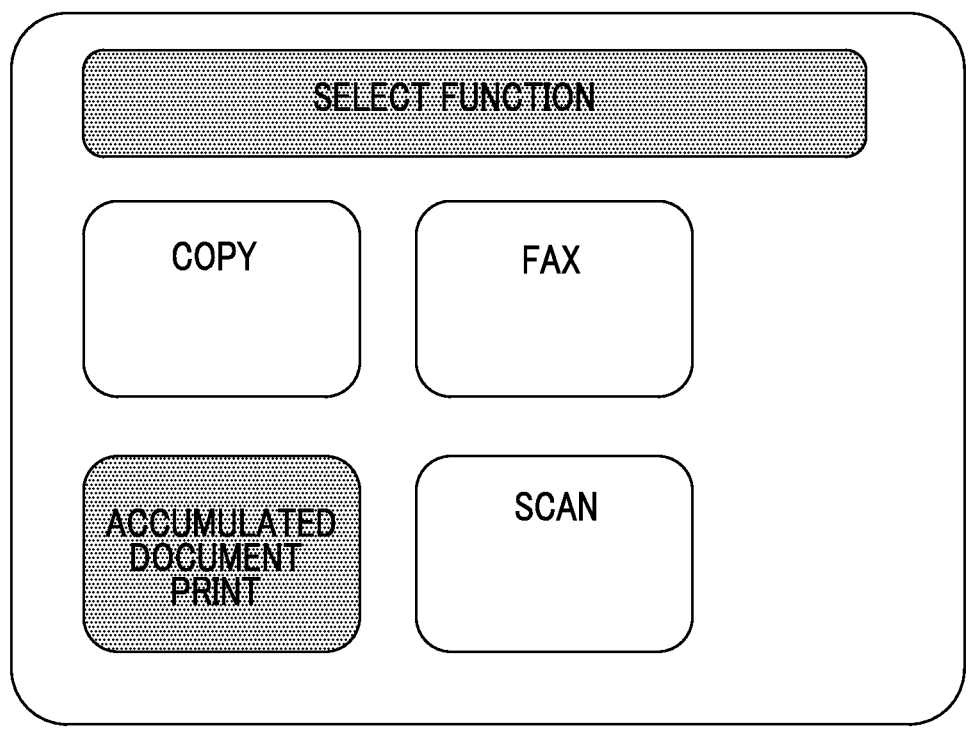
FIG. 6 is a diagram illustrating an exemplary manipulation unit where a selection screen for selecting services that can be provided by the image forming apparatus is displayed.
Figure 7:
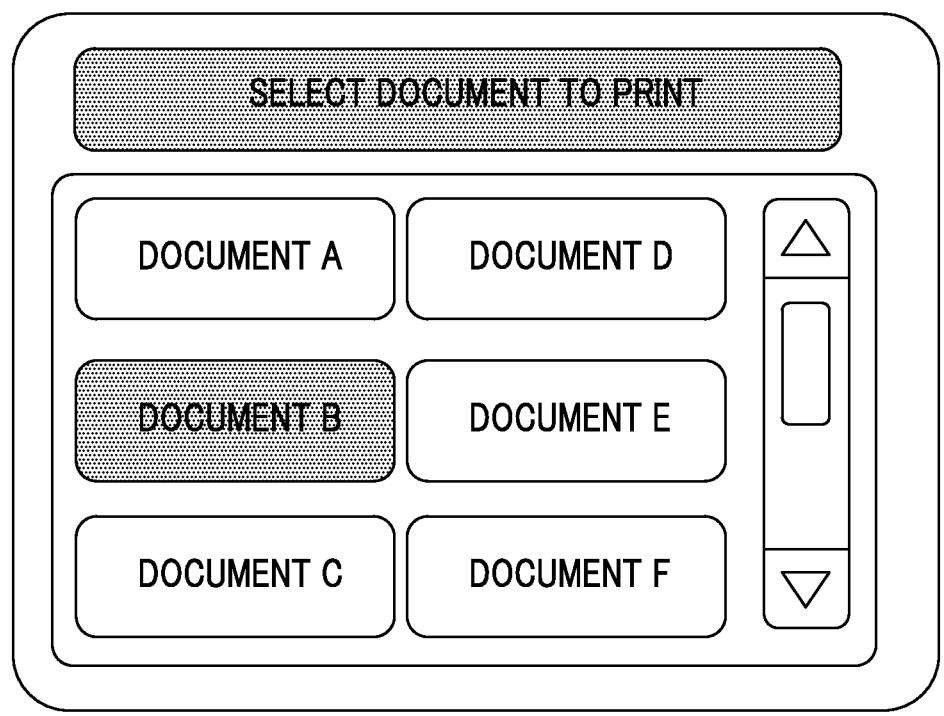
FIG. 7 is a diagram illustrating an exemplary manipulation unit where a selection screen for printable document names is displayed.
Figure 8:
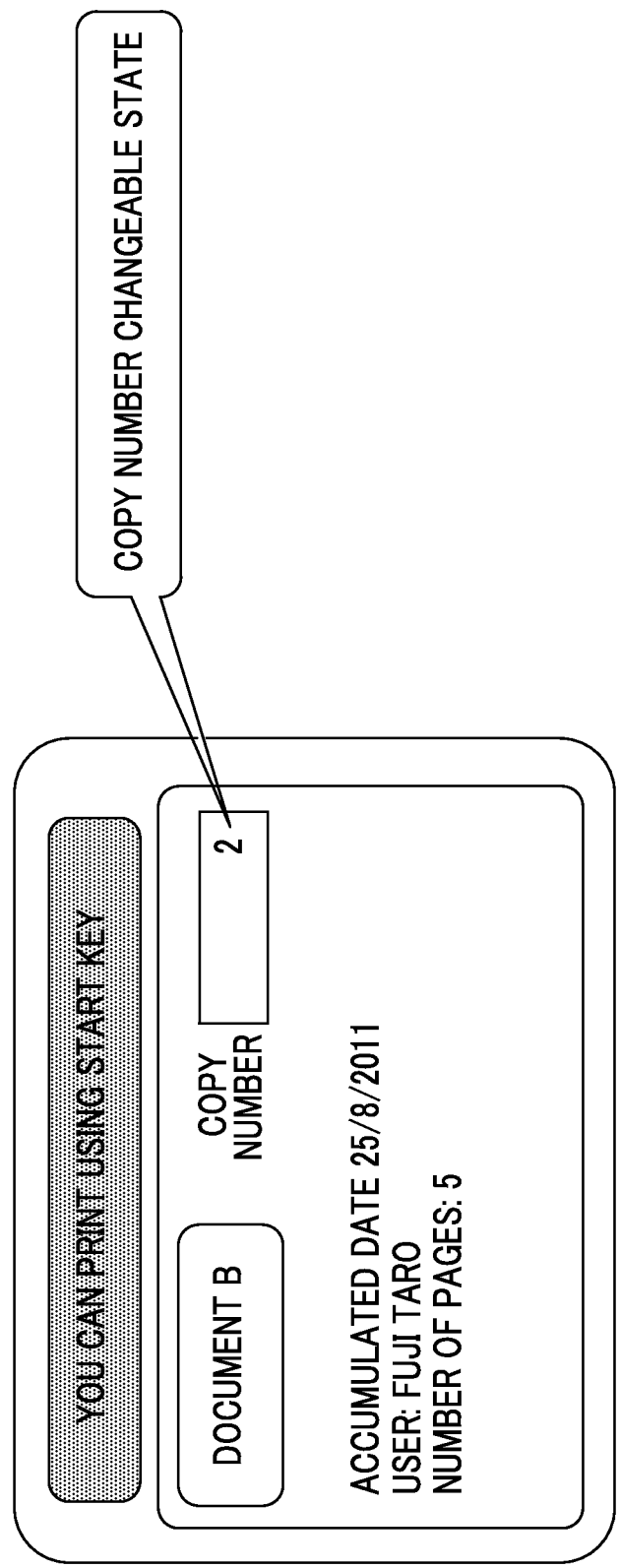
FIG. 8 is a diagram illustrating an exemplary manipulation unit where a document name, a copy number, a storage date/time, and the like selected by the selection screen of FIG. 7 are displayed.

Here, FIGS. 6 to 8 are diagrams illustrating a display example of the manipulation unit 21 in the image forming apparatus 20.

First, as shown in FIG. 6, the manipulation unit 21 displays a selection screen for services (function) providable by the image forming apparatus 20, such as "COPY", "FAX", "ACCUMULATED DOCUMENT PRINT", and "SCAN".

If "ACCUMULATED DOCUMENT PRINT" for executing the accumulated document print is pressed and selected in such a selection screen by a user, the selection screen of the document name that can be printed (accumulated or stored) is displayed on the manipulation unit 21 as shown in FIG. 7.

In this case, for example, the image forming apparatus 20 displays all the stored documents as a list or displays only documents that are stored by the user as the list if a user has a log-in state. However, the invention is not limited to the display method here.

If a printable document (in this example, "document B") is pressed and selected by a user on such a selection screen, as shown in FIG. 8, the selected document name (in this example, "document B"), the print copy number (accumulated copy number, in this example, two copies), the storage date/time, and the like are displayed on the manipulation unit 21 based on the document information of the selected document. At this time, the print copy number is displayed on the manipulation unit 21 as the changeable state (change receiving state) through the process of step S4. For example, display on the manipulation unit 21 is made such that the copy number can be changed by inputting the copy number using a numeric keypad (not shown).

Then, in step S5, the display control unit 91 determines whether or not the copy number is input (whether or not the copy number is changed). If it is determined that the copy number is input, the process of the display control unit 91 advances to step S6. In addition, if it is determined that the copy number is not input, the process of the display control unit 91 advances to step S7.

In step S6, the display control unit 91 sets the input copy number (the changed copy number) to the print copy number. Then, the process of the display control unit 91 advances to step S7.

In step S7, the display control unit 91 determines whether or not the start key for the print start is pressed by a user. If the display control unit 91 determines that the start key is pressed, the process advances to step S8. If the display control unit 91 determines that the start key is not pressed, the display control unit 91 restarts the processing from step S5.

Through the processing of such step S5 to step S7, the display control unit 91 sets the print copy number the input copy number whenever the copy number is input (changed) until the start key is pressed.

In step S8, the control unit 31 executes the accumulated document print processing. The control unit 31 terminates the output processing illustrated in FIG. 4 after the accumulated document print processing is completed. Here, for the accumulated document print processing, the image forming control unit 92 mainly performs the processing, and the identifier computing unit 93 or the information acquisition unit 94 performs the processing as necessary.

Next, the accumulated document print processing in step S8 of FIG. 4 will be described in detail.

Figure 9:
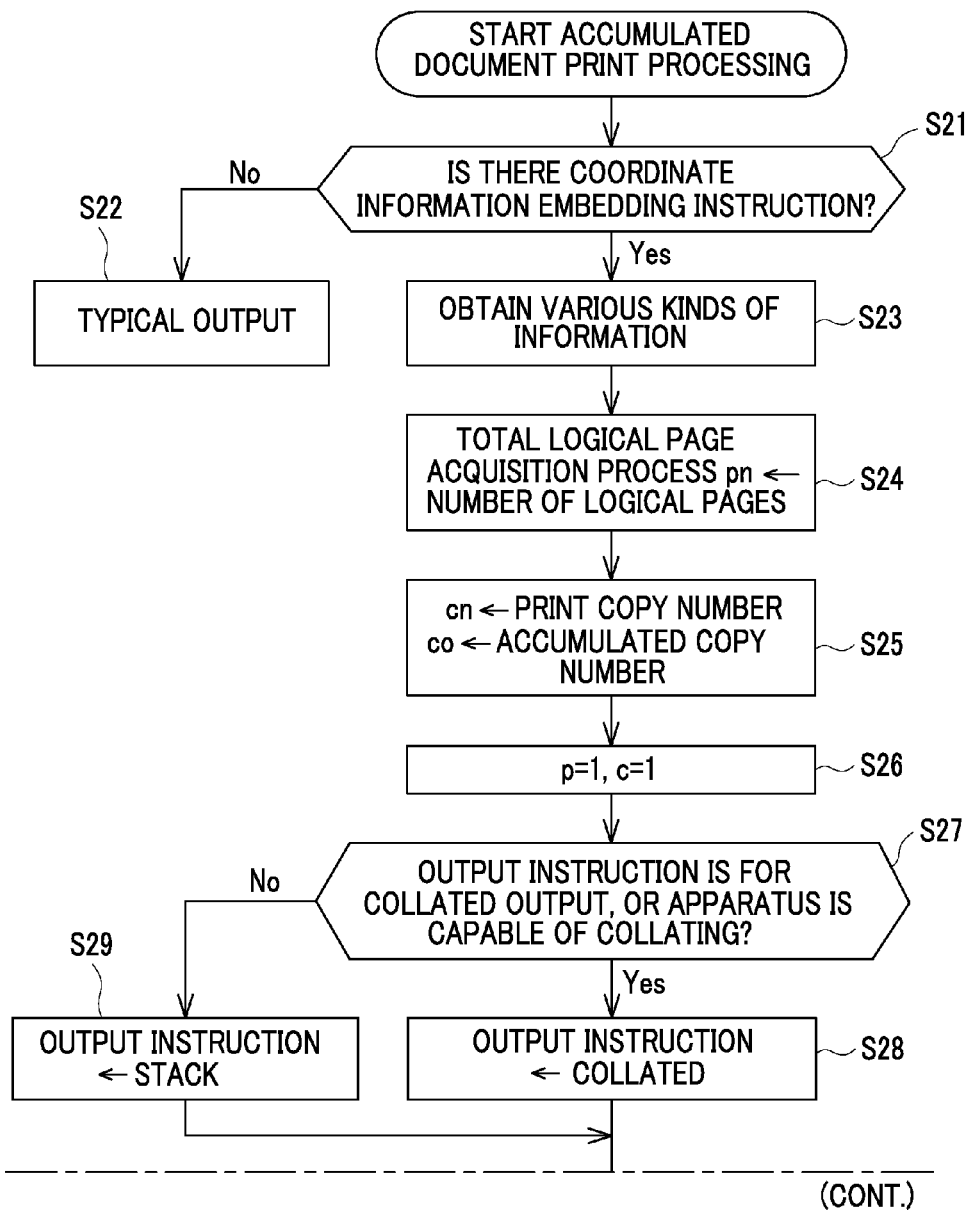
FIG. 9 is a flowchart illustrating an exemplary accumulated document print process.

FIG. 9 is a flowchart illustrating an exemplary accumulated document print processing.

As shown in FIG. 9, first, in step S21, the control unit 31 determines whether or not there is a coordinate information embedding instruction (whether or not coordinate information embedding instruction is included in the print file). If the control unit 31 determines that there is the coordinate information embedding instruction, the process advances to step S23. In addition, if the control unit 31 determines that there is no coordinate information embedding instruction, the process advances to step S22.

In step S22, the control unit 31 performs the output processing through a typical image formation.

In step S23, the control unit 31 obtains various kinds of information. Specifically, the control unit 31 obtains information necessary in the subsequent processing, that is, the initial identifier information included in the print file, the print copy number, or the content of the output type instruction such as collated output or stack output. For example, the information acquisition unit 94 performs the processing of this step S23.

In step S24, the control unit 31 performs the total logical pages acquisition processing. Specifically, the control unit 31 sets the value pn to the logical pages. Then, in step S25, the control unit 31 sets the value cn to the print copy number, and the value co is set to the accumulated copy number (the print copy number initially stored for the accumulated document print).

Then, in step S26, the control unit 31 sets both the value p indicating the logical page number and the value c indicating the number of the output copies to 1 (initialization).

Then, in step S27, the control unit 31 determines whether or not the output instruction is for the collated output, or the apparatus is capable of the collated output. If it is determined YES, the process of the control unit 31 advances to step S28. If it is determined NO, the process of the control unit 31 advances to step S29.

In step S28, the control unit 31 sets the output instruction to the collated output (maintain the output instruction in the collated output). Then, the process of the control unit 31 advances to step S30.

In step S29, the control unit 31 sets the output instruction to the stack output (changes the output instruction to the stack output). Then, the process of the control unit 31 advances to step S30.

Here, the processing of steps S27 to S29 is provided due to the following reasons.

In the control unit 31, it is not to say that the type designated in the initial output instruction (for example, output instruction by a user) is necessarily output. For example, while it is necessary to provide a storage unit for accumulating the image data to perform the collated output, such a storage unit may not be provided depending on the configuration of the control unit 31. In such cases, the control unit 31 may switch the output type from the collated output to the stack output.

For this reason, the control unit 31 changes the output instruction according to a configuration aspect of the control unit 31 or a processing aspect (predetermined condition) through the processing of steps S27 to S29.

In step S30, the control unit 31 performs the output processing (image forming processing) on a physical-page basis. The output processing on a physical-page basis will be described below.

Then, in step S31, the control unit 31 determines whether or not the collated output is instructed. If the control unit 31 determines that the collated output is instructed, the process advances to the step S32. If the control unit 31 determines that the collated output is not instructed (if the stack output is instructed), the process advances to step S36.

In step S32, the control unit 31 adds 1 to the value p (increments the value p).

Then, in step S33, the control unit 31 determines whether or not the value p (logical page corresponding to the page p) exists. If the control unit 31 determines that the value of p exists, the control unit 31 starts the reprocessing from step S30. As a result, the next logical page corresponding to the output copy number of the value c is printed. If it is determined that the value p does not exist, the process of the control unit 31 advances to step S34.

In step S34, the control unit 31 adds 1 to the value c (increment the value c). In addition, the control unit 31 sets the value p to 1 (initializes the value p).

Then, in step S35, the control unit 31 determines whether or not the value c set in step S31 is greater than the value cn set in step S25. If it is determined that the value c is greater than the value cn (c>cn), the control unit 31 terminates the print processing of FIG. 9. If it is determined that the value c is equal to or smaller than the value cn (c≤cn), the control unit 31 starts the reprocessing from step S30. That is, the control unit 31 starts the print from the first page of the logical pages corresponding to the next output copy number.

In step S36, the control unit 31 adds 1 to the value c (increments the value c).

Then, in step S37, the control unit 31 determines whether or not the value c is greater than the value cn set in the step S25. If it is determined that the value c is greater than the value cn (c>cn), the process of the control unit 31 advances to step S38. If it is determined that the value c is equal to or smaller than the value cn (c≤cn), the control unit 31 starts the reprocessing from step S30. That is, the control unit 31 performs control to print the logical pages of the value p corresponding to the next output copy number.

In step S38, the control unit 31 adds 1 to the value p (increment the value of p). In addition, the control unit 31 sets the value c to 1 (initializes the value c).

Then, in step S39, the control unit 31 determines whether or not the value p exists. If it is determined that the value p exists, the control unit 31 starts the reprocessing from step S30. In addition, it is determined that the value p does not exist, the control unit 31 terminates the print processing of FIG. 9.

Through a series of steps S30 to S39 described above, the process of computing the identifier and combining the physical pages is implemented. For example, the process relating to the identifier computation is implemented by the identifier computing unit 93.

Next, the output processing on a physical-page basis in step S30 of FIG. 9 will be described in detail.

FIG. 10 is a flowchart illustrating an exemplary output processing on a physical-page basis.

As shown in FIG. 10, first, in step S51, the control unit 31 determines whether or not the output instruction is the duplex print. If it is determined that the output instruction is the duplex print, the process of the control unit 31 advances to step S52. If it is determined that the output instruction is the one-side print, the process of the control unit 31 advances to step S56.

In step S52, the control unit 31 determines whether or not the value p+1 (rear surface) exists. If it is determined that the value p+1 (rear surface) exists, the process of the control unit 31 advances to step S53. If it is determined that the value p+1 (rear surface) does not exist, that is, if the last page of the logical pages for which the duplex print has been instructed becomes the cover sheet, the process of the control unit 31 advances to step S56.

Then, in step S53, the control unit 31 performs a page drawing processing for the value p ($p_{th}$ page). The page drawing processing is a process for drawing an image on the physical page (one page) in the output processing on a physical-page basis. The page drawing processing will be described in detail below.

Next, in step S54, the control unit 31 adds 1 to the value p (increments the value p).

Then, in step S55, the control unit 31 performs the page drawing processing for the value p+1 ((p+1)th page). The process of the control unit 31 advances to step S58.

Meanwhile, in step S56, a page allocation attribution of the value p is set to "single-side."

Then, in step S57, the control unit 31 performs the page drawing processing for the value p ((p)th page). Then, the process of the control unit 31 advances to step S58

In step S58, the control unit 31 performs conveyance of the sheet having the image and a print processing.

Then, in step S59, the control unit 31 determines whether or not the page output is terminated. That is, the control unit 31 determines whether or not print processing is performed for the sheets corresponding to one page, and the sheets are externally output. If it is determined that the page output is terminated, the control unit 31 terminates the page output processing of FIG. 10.

Next, the page drawing processing of steps S53, S55, or S56 in FIG. 10 will be described in detail.

Figure 11:
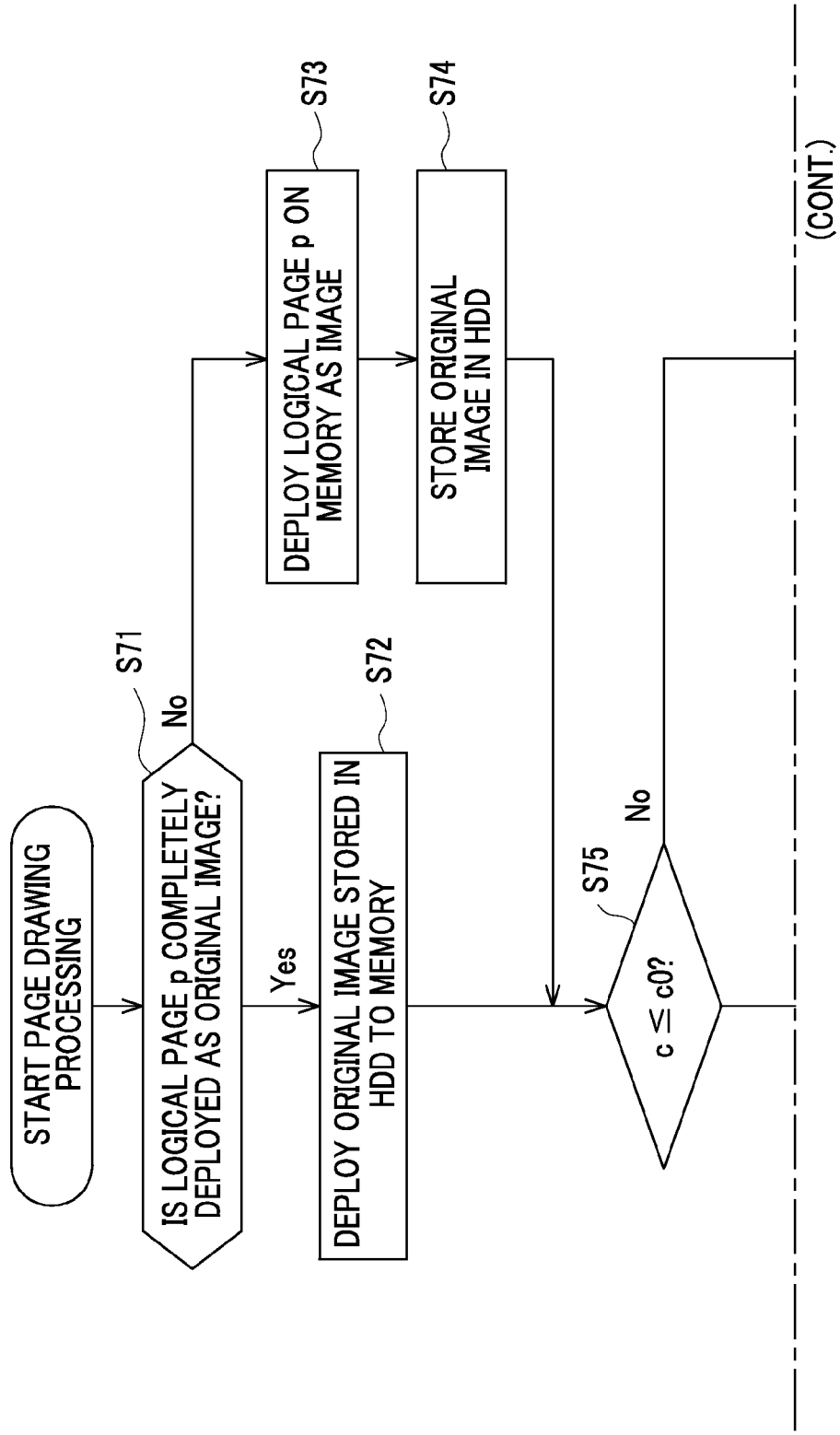
FIG. 11 is a flowchart illustrating an exemplary page drawing processing.

FIG. 11 is a flowchart illustrating an exemplary page drawing processing.

As shown in FIG. 11, first, in step S71, the control unit 31 determines whether or not the logical page of the value p ((p)th page) is completely deployed as the original image. That is, the control unit 31 deploys the logical page to the memory 32 as image and determines whether or not the image is completely stored in the HDD 33. If it is determined that the expansion is completed as the original image, the control unit 31 is advanced to step S72. If it is determined that the expansion is not completed as the original image, the control unit 31 is advanced to step S73.

In step S72, the control unit 31 deploys the original image of the logical page of the value p on the read memory 32 from the HDD 33. Then, the process of the control unit 31 advances to step S75.

In step S73, the control unit 31 deploys the original image of the logical page of the value p on the read memory 32.

Then, in step S74, the control unit 31 stores the original image of the logical page deployed on the memory 32 in step S73 in the HDD 33. Then, the process of the control unit 31 advances to step S75.

In step S75, the control unit 31 determines whether or not the latest value c (latest output copy number) set in step S34 or step S36 in the FIG. 9 is equal to or smaller than the value co (accumulated copy number) set in step 25 in FIG. 9. If it is determined that the value c is equal to or smaller than the value co ($c \leq co$), the process of the control unit 31 advances to step 76. In addition, if it is determined that the value c is greater than the value co ($c > co$), the process of the control unit 31 advances to step S79.

In step S76, the control unit 31 generates the code image (identifier ID which is identifier information and image obtained by encoding the coordinate information) based on a sheet size and an identifier ID.

Then, in step S77, the control unit 31 combines the code image generated in step S76 and the original image deployed on the memory 32 in the step S72 or S73 and forms an image on the sheet based on the combined image.

Then, in step S78, the control unit 31 adds 1 to the ID. The control unit 31 terminates the page drawing processing of FIG. 11.

Meanwhile, in step S79, the control unit 31 forms the original image deployed on the memory 32 in step S72 or S73 on the sheet without combining a code image. Then, the process of the control unit 31 advances to step S78.

If output copy number c is equal to or smaller than the accumulated copy number co as a result of steps S75 to S79, the control unit 31 forms an image on the sheet based on the combined image obtained by combining the code image and the original image. If the output copy number c is greater than the accumulated copy number co, the control unit 31 forms an image on the sheet only using the original image.

Next, the operation in the image processing system 1 will be described.

First, a series of processing examples in the image processing system 1 will be described with reference to FIGS. 12 and 13.

First, referring to FIG. 12, if a user instructs print execution (output setting) and coordinate information embedding using the host computer 10, the identifier reservation request is transmitted to the identifier management server 40 through the communication unit 80.

As the identifier reservation request is received from the host computer 10, the identifier management server 40 searches and reserves an unoccupied identifier space. In addition, the identifier management server 40 stores information on the reserved identifier group, the initial identifier, the logical page number, and the print copy number by associating each other. The identifier management server 40 transmits the first identifier to the host computer 10.

As the first identifier information is received from the identifier management server 40, the host computer 10 creates a single print file based on the print data, the output type instruction, the coordinate information embedding instruction, and the first identifier information. The host computer 10 transmits the created print file to the image forming apparatus 20 through the communication unit 80. Meanwhile, the host computer 10 transmits the original document data of the print data transmitted to the image forming apparatus 20 along with the first identifier information to the document server 50.

If the text data and the first identifier information are received from the host computer 10, the document server 50 memorizes the received text data and first identifier information to the storage unit 52. The document server 50 also memorizes the area information corresponding to a case where the area information has been transmitted from the host computer 10 to the storage unit 52.

In the image forming apparatus 20, as the print file is received from the host computer 10, the identifier of each of the physical pages is obtained based on the first identifier included in the print file when the coordinate information embedding instruction is included in the print file. In addition, the control unit 31 generates the coordinate information image each of the physical pages. As a result, the image forming apparatus 20 generates the code image depending on the identifier information and the coordinate information image. The image forming apparatus 20 combines the created code image and the original image based on the print data on a physical-page basis to create a combined image and forms the created combined image on the sheet.

Here, as described above, the image forming apparatus 20 is configured such that a user can change the print copy number when the accumulated document is printed (FIG. 4). As a result, a user can change the print copy number for the accumulated document print to a value greater than the accumulated copy number. In this regard, the image forming apparatus 20 forms an image by combining the code image and the original image for the print within the accumulated copy number co and forms an image only using the original image without combining the code image for the print of the output copy number greater than the accumulated copy number co.

When the changed print copy number is greater than the accumulated copy number, the image forming apparatus 20 may also perform the print of the changed print copy number using the identifier of the identifier space reserved by the identifier management server 40. As a result, the image forming apparatus 20 prevents the identifier not allocated from the identifier management server 40 from being combined with the physical page when the changed print copy number is greater than the accumulated copy number and prevents occurrence of mismatching between the physical page and the identifier caused by changing the print copy number.

Here, description will made for an output example in a case where a user changes the print copy number for the accumulated document print to a value greater than the accumulated copy number.

Figure 14:
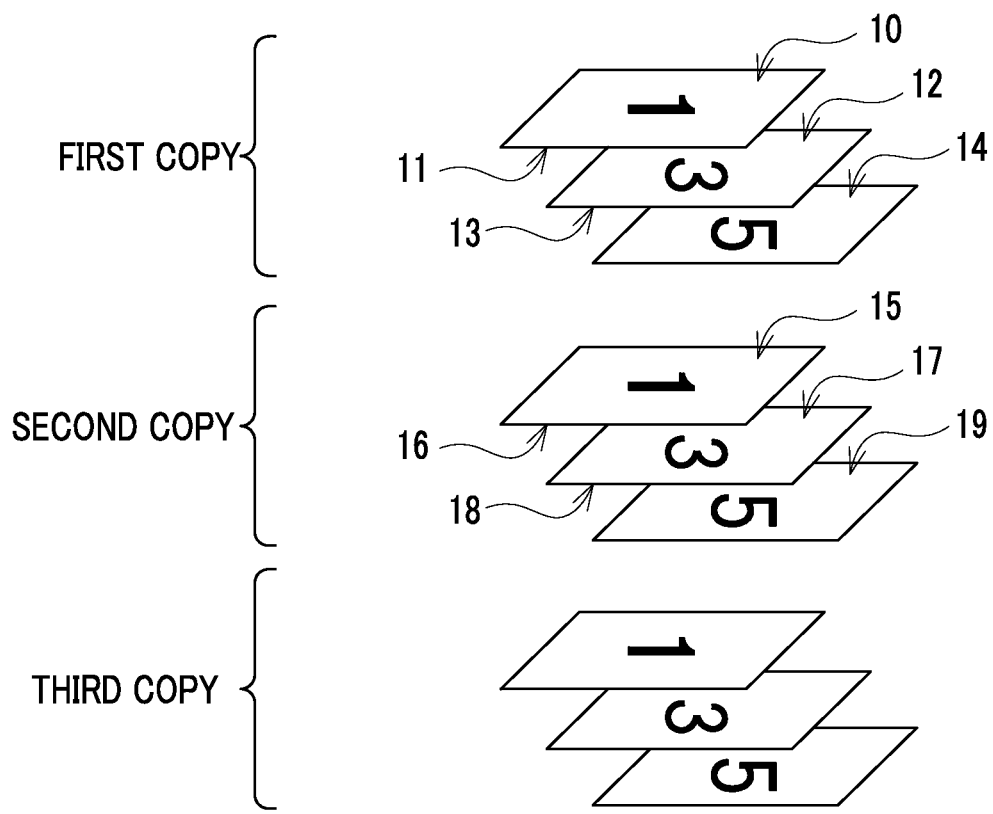
FIG. 14 is a diagram illustrating an exemplary identifier corresponding to each physical page in the case of a collated output.

FIG. 14 is a diagram illustrating the output example when the print copy number is changed to 3 by a user in the image forming apparatus 20 side when the accumulated copy number is 2, and the number of logical pages is 5. In addition, in this output example, it is assumed that the print type is set to the duplex print, and the output type is set to the collated output. In addition, in this output example, it is assumed that the initial identifier value is set to 10.

As shown in FIG. 14, the image forming apparatus 20 associates the identifiers 10, 11, 12, 13, and 14 with the print pages of each physical page numbers 1, 2, 3, 4, and 5 corresponding to the logical page numbers 1, 2, 3, 4, and 5 for a first copy. In addition, the image forming apparatus 20 associates the identifiers 15, 16, 17, 18, and 19 with the print pages of each physical page numbers 6, 7, 8, 9, and 10 corresponding to the logical page numbers 1, 2, 3, 4, and 5 for the second copy. However, the image forming apparatus 20 does not associate an identifier with the print pages of each physical page numbers 11, 12, 13, 14, and 15 corresponding to the logical page numbers 1, 2, 3, 4, and 5 for the third copy.

In FIG. 14, while the identifier is illustrated as an arrow for each physical page of the first and second copies, the identifier is encoded and combined with the image of each physical page in practice.

In this manner, the image forming apparatus 20 forms only the original image in case of print for the output copy number (in the example of FIG. 14, the third copy) greater than the accumulated copy number co.

As shown in FIG. 13, the pen type scanner 70 reads the embedded code image and reads the coordinate information and the identifier information from the code image when the image is written to the sheet. When the transmission button is pressed, the pen type scanner 70 transmits the read coordinate information and the identifier information along with the stroke information to the processing server 60.

As the information is received from the pen type scanner 70, the processing server 60 transmits the identifier reservation request to the identifier management server 40 using the identifier within the information.

As the identifier reservation request is received from the processing server 60, the identifier management server 40 returns the initial identifier and the logical page number corresponding to the identifier relating to the identifier reservation request to the processing server 60.

As the initial identifier and the logical page number are received from the identifier management server 40, the processing server 60 transmits the document information reservation request to the document server 50 using that information.

As the document information reservation request is received from the processing server 60, the document server 50 obtains the document data (document information and the like corresponding to the logical page number) corresponding to the initial identifier and the logical page number included in the document information reservation request. The document server 50 transmits the obtained document data to the processing server 60. Here, the document server 50 also transmits the area information if the area information is stored in the processing server 60.

As the document data (document information and the like) is received from the document server 50, the processing server 60 performs the processing such as questionnaire aggregation and the like using the print data and the stroke information.

Here, an exemplary process of the questionnaire aggregation will be described.

It is assumed that a user inputs the area information in the host computer 10, and the area information (the area of a specific coordinate area and information such as an item to be written) is registered in the document server 50. For example, the area information of a small rectangular check box includes a coordinate area of the check box and shape information on the value to be written to the check box such as "x" or "✓".

In this case, the processing server 60 recognizes what information is written to the specific area based on the coordinate information by receiving the area information along with the print data from the document server 50. For example, the processing server 60 recognizes the sign "x" or "✓" entered in the check box based on the coordinate information and the stroke information of the character written to the actual questionnaire sheet using the pen type scanner 70 and transmitted from the pen type scanner 70.

If other kinds of numerical information or Japanese/Chinese characters are registered as the item to be written, the processing server 60 may recognize the numerical information or Japanese/Chinese characters by recognizing the stroke information using OCR (Optical Character Reader) and the like.

The processing server 60 aggregates the information recognized in this way as the electronic data.

Since the processing server 60 performs the questionnaire aggregation as described above, a user and the like of the processing server 60 can aggregate the questionnaire without collecting the questionnaire sheets and manually aggregating the description content of the collected questionnaire sheets. This improves processing efficiency of the questionnaire aggregation.

Here, according to an exemplary embodiment of the invention, the HDD 33 serves as, for example, an accumulation unit. The manipulation unit 21 serves as, for example, an instruction unit and a change unit. For example, the image forming unit 23 serves as an output unit. For example, the control unit 31 (for example, identifier computing unit 93) serves as an identifier operation unit. In addition, the control unit 31 and the memory 32 serve as, for example, the combining unit. In addition, the coordinate information embedding instruction serves as, for example, information for combining the identifier with the physical page.

Needless to say, the invention is not limited to the exemplary embodiments described above.

For example, according to an exemplary embodiment of the invention, since both the print page having the combined identifier (print pages of the first and second copies in the example of FIG. 14) and the print page having no combined identifier (the print page of the third copy in the example of FIG. 14) are output, information for distinguishing them may be added to each print page. For example, the image forming apparatus 20 adds information indicating whether or not the identifier is combined with each print page as an identifiable aspect.

In the exemplary embodiment described above, the print copy number used by the identifier management server 40 to reserve the identifier space is set to be equal to the copy number set by a user (copy number set in host computer 10). In contrast, according to an exemplary embodiment of the invention, the identifier management server 40 may reserve the identifier space using an affordable final print copy number for the print copy number set by a user. Here, the "affordable final print copy number" may be set by adding 2 to the print copy number set by a user. In addition, when the identifier management server 40 can set such a final print copy number, the entire image forming system 1 also performs the processing accordingly.

As a result, the image forming apparatus 20 also performs the processing for the accumulated copy number by adding, to the accumulated copy number, the copy number added by the identifier management server 40 when the identifier space is reserved regarding the number of copies received from the host computer 10. For example, when a user sets the print copy number to 3 using the host computer 10, and the identifier management server 40 reserves the identifier space by setting the print copy number to 5 (by adding 2), the image forming apparatus 20 performs the processing by treating the accumulated copy number as 5. As a result, the image forming apparatus 20 may maintain the convenience of the identifier combination by allowing the combination of the identifier for the increasing amount in a case where a user slightly increases the print copy number.

In an exemplary embodiment of the invention, the host computer 10 may include a function of the identifier management server 40. That is, the host computer 10 may manage the identifier group.

Second Exemplary Embodiment

Next, a second exemplary embodiment will be described, in which like reference numerals denote like elements as in the first embodiment.

In the second exemplary embodiment, if the changed print copy number is greater than the accumulated copy number, the image forming apparatus 20 does not perform the print for the increased copy number.

FIGS. 15 to 17 are flowcharts illustrating a processing example thereof. FIG. 15 is a flowchart illustrating an output processing, FIG. 16 is a flowchart illustrating the accumulated document print processing, and FIG. 17 is a flowchart illustrating a page drawing processing.

As shown in FIG. 15, in the output processing, if it is determined that the start key is pressed in step S7, the process of the control unit 31 (display control unit 91) advances to step S91.

In step S91, the control unit 31 determines whether or not there is a coordinate information embedding instruction (coordinate information embedding instruction is included in the print file). If it is determined that there is a coordinate information embedding instruction, the process of the control unit 31 advances to step S92. If it is determined that there is no the coordinate information embedding instruction, the process of the control unit 31 advances to step S8.

In step S92, the control unit 31 determines whether or not the changed print copy number (print copy number set in step S6) is equal to or smaller than the accumulated copy number. If it is determined that the changed print copy number is equal to or smaller than the accumulated copy number (changed print copy number≤accumulated copy number), the process of the control unit 31 advances to step S8. If it is determined that the changed print copy number is greater than the accumulated copy number (changed print copy number>accumulated copy number), the process of the control unit 31 advances to step S93.

In step S93, the control unit 31 sets the accumulated copy number which is an initial value to the print copy number. The process of the control unit 31 advances to step S8.

In the accumulated document print processing, as shown in FIG. 16, the control unit 31 only sets the value cn to the print copy number in step S111 changed from step S25.

In the page drawing processing, as shown in FIG. 17, the process of the control unit 31 directly advances from step S72 or S74 to step S76 without performing the processing of steps S75 and S79.

Other components of the image processing system 1 according to the second exemplary embodiment are similar to those of the image processing system 1 according to the first exemplary embodiment.

Next, the operation of the image processing system 1 according to the second exemplary embodiment will be described.

In the image processing system 1 according to the second exemplary embodiment, if the changed print copy number is greater than the accumulated copy number, the image forming apparatus 20 performs the accumulated document print processing after the print copy number is returned to the accumulated copy number. If the changed print copy number is equal to or smaller than the accumulated copy number, the image forming apparatus 20 performs the accumulated document print processing (FIG. 15) without change. The image forming apparatus 20 performs the accumulated document print processing based on the finally set print copy number (FIGS. 16, 17, and the like).

As a result, the image forming apparatus 20 performs the print in the range of the identifier allocated from the identifier management server 40 because the print copy number is returned to the accumulated copy number (FIG. 15) if the changed print copy number is greater than the accumulated copy number. As a result, the image forming apparatus 20 prevents the identifier not allocated from the identifier management server 40 from being combined with the physical page and outputted and prevents mismatching between the identifier and the physical page caused by the change of the print copy number.

Needless to say, the invention is not limited to the second exemplary embodiment described above.

Figure 18:
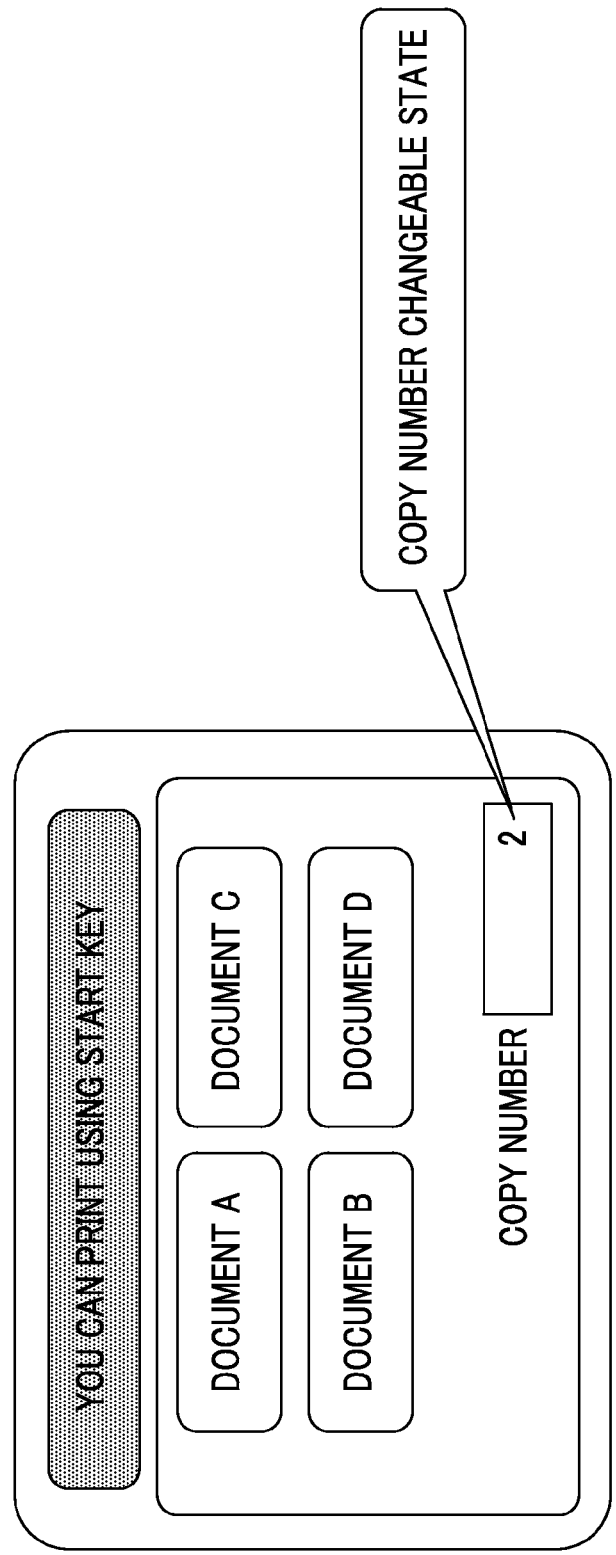
FIG. 18 is a diagram illustrating an exemplary manipulation unit where a selected document name, a print copy number, a storage date/time, and the like are displayed according to a second embodiment of the invention.

For example, according to an exemplary embodiment of the invention, the image forming apparatus 20 may change the print copy numbers of plural text (print data) stored for the accumulated document print at once. In this case, for example, it is assumed that, if the selection screen for services (functions) that can be supplied by the image forming apparatus 20 is displayed on the manipulation unit 21 as shown in FIG. 6, the "accumulated document print" for executing the accumulated document print is pressed and selected by a user. Then, the document name of that text (in this example, "DOCUMENT A," "DOCUMENT B," "DOCUMENT C," AND "DOCUMENT D") and the print copy number are displayed on the manipulation unit 21 based on the document information of the stored document as shown in FIG. 18. If the print copy number is changed, the image forming apparatus 20 individually determines the change of the print copy number for each text and performs the output processing. For example, the image forming apparatus 20 performs, for each sentence, the processing subsequent to step S91 that is carried out when the start key is pressed.

As a result, the image forming apparatus 20 performs the accumulation text print processing by returning the print copy number to the accumulated copy number for the text having the changed print copy number greater than the accumulated copy number. As a result, print is made such that the print copy number of the text having the changed print copy number greater than the accumulated copy number is smaller than the print copy number of other text.

In a case where the same processing is performed for the first exemplary embodiment, the print copy number of each text is made to be equal. However, for the text having the changed print copy number greater than the accumulated copy number, the identifier is not combined with the physical pages of the copy number greater than the accumulated copy number.

Third Exemplary Embodiment

Next, a third exemplary embodiment of the invention will be described, in which like reference numerals denote like elements as in the second exemplary embodiment.

According to the third exemplary embodiment, when there is the coordinate information embedding instruction, that is, when the identifier is combined, the image forming apparatus 20 is not allowed to change the print copy number.

FIG. 19 is a flowchart illustrating an output processing of that processing example.

As shown in FIG. 19, the control unit 31 performs the processing of step S131 after step S3.

In step S131, the control unit 31 (display control unit 91) determines whether or not the coordinate information embedding instruction is included in the file (the coordinate information embedding instruction is included in the print file). If it is determined that there is the coordinate information embedding instruction, the process of the control unit 31 advances to the step 7. If it is determined that there is no coordinate information embedding instruction, the process of the control unit 31 advances to the step S132.

In step S132, the control unit 31 displays the print copy number on the manipulation unit 21 as the change receiving state (changeable state).

Then, in step S133, the control unit 31 determines whether or not the copy number is input (copy number change). If it is determined that the copy number is input, the process of the control unit 31 advances to step S134. If it is determined that the copy number is not input, the process of the control unit 31 advances to step S7.

In step S134, the control unit 31 sets the input of copies (changed copy number) to the print copy number. The process of the control unit 31 advances to step S7.

In step S7, the control unit 31 determines whether or not the start key for the print start is pressed by a user. If it is determined that the start key is pressed, the process of the control unit 31 advances to step S8. If it is determined that the start key is not pressed, the control unit 31 restarts the processing from step S131.

Other components of the image processing system 1 according to the third exemplary embodiment are similar to those of the second exemplary embodiment.

Next, the operation of the image processing system 1 according to the third exemplary embodiment will be described.

In the image processing system 1 according to the third exemplary embodiment, the image forming apparatus 20 allows change of the print copy number if there is no coordinate information embedding instruction, and does not allow change of the print copy number if there is the coordinate information embedding instruction (FIG. 19).

FIG. 20 is a diagram illustrating a display example of the manipulation unit 21 in a case where there is the coordinate information embedding instruction, that is, change of the print copy number is not allowed. As shown in FIG. 20, in the manipulation unit 21, display of the print copy number is fixed, and the change of the print copy number is not allowed.

Since the change of the print copy number is not allowed if there is the coordinate information embedding instruction (FIG. 19), the image forming apparatus 20 performs the print within the range of the identifier allocated from the identifier management server 40. As a result, the image forming apparatus 20 prevents the identifier not allocated from the identifier management server 40 from being combined with the physical page and outputted and prevents occurrence of mismatching between the identifier and the physical page caused by the change of the print copy number.

Fourth Exemplary Embodiment

Next, a fourth exemplary embodiment of the invention will be described, in which like reference numerals denote like elements as in the second exemplary embodiment.

According to the fourth exemplary embodiment, if there is the coordinate information embedding instruction, that is, if the identifier is combined, the image forming apparatus 20 only allows the change for reducing the print copy number.

FIG. 21 is a flowchart illustrating an output processing of the processing example.

As shown in FIG. 21, in step S5, the control unit 31 (display control unit) determines whether or not the copy number is input (change of the copy number). If it is determined that the copy number is input, the process of the control unit 31 advances to step S151. If it is determined that no copy number is input, the process of the control unit 31 advances to step S7.

In step S151, the control unit 31 determines whether or not there is the coordinate information embedding instruction (the coordinate information embedding instruction is included in the print file). If it is determined that there is the coordinate information embedding instruction, the process of the control unit 31 advances to step S152. If it is determined that there is no coordinate information embedding instruction, the process of the control unit 31 advances to step S154.

In step S152, the control unit 31 determines whether or not the input copy number (changed copy number) is equal to or smaller than the accumulated copy number. If it is determined that the input copy number (changed copy number) is equal to or smaller than the accumulated copy number (input copy number≤accumulated copy number), the process of the control unit 31 advances to step S154. If it is determined that the input copy number (changed copy number) is greater than the accumulated copy number (input copy number>accumulated copy number), the process of the control unit 31 advances to step S153.

In step S153, the control unit 31 displays an error message (message and the like indicating that the print copy number may not be changed) on the manipulation unit 21. Then, the process of the control unit 31 advances to step S7.

In step S154, the control unit 31 sets the print copy number to the input copy number (changed copy number). Then, the process of the control unit 31 advances to step S7.

In step S7, the control unit 31 determines whether or not the start key for the print start is pressed by a user. If it is determined that the start key is pressed, the process of the control unit 31 advances to step S8. In addition, if it is determined that the start key is not pressed, the control unit 31 restarts the processing from step S5.

In addition, other components of the image processing system 1 according to the third exemplary embodiment are similar to those of the second exemplary embodiment.

Next, the operation of the image processing system 1 according to the fourth exemplary embodiment will be described.

In the image processing system 1 according to the fourth exemplary embodiment, if there is the coordinate information embedding instruction, the image forming apparatus 20 sets the print copy number to the input copy number when the input copy number is equal to or smaller than the accumulated copy number. When the input copy number is greater than the accumulated copy number, the error message is displayed on the manipulation unit 21, and the print copy number is not set to the input copy number (FIG. 21). That is, if there is the coordinate information embedding instruction, the image forming apparatus 20 allows the change of the print copy number for reducing the accumulated copy number. However, the image forming apparatus 20 does not allow the change by displaying the error message on the manipulation unit 21 for the change input for increasing the accumulated copy number.

Figure 22:
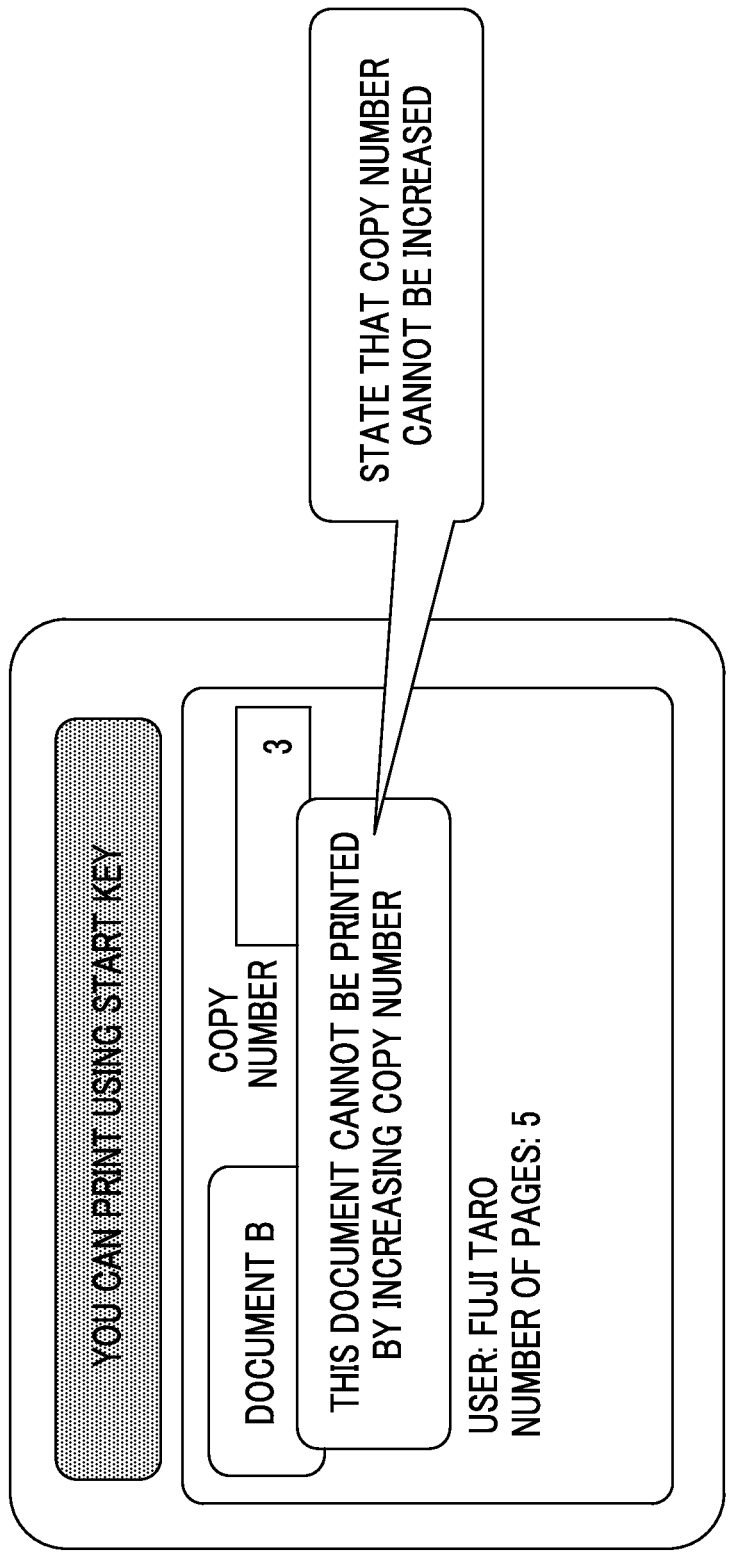
FIG. 22 is a diagram illustrating an exemplary manipulation unit where a selected document name, a print copy number, a storage date/time, and the like are displayed according to a fourth embodiment of the invention.

FIG. 22 is a diagram illustrating a display example of the manipulation unit 21 when the input copy number is greater than the accumulated copy number in a case where there is the coordinate information embedding instruction. As shown in FIG. 22, on the manipulation unit 21, an error message is displayed such as "This document is not allowed to print by increasing the copy number."

In this manner, the image forming apparatus 20 performs the print within a range of the identifier allocated from the identifier management server 40 since only the change for reducing the print copy number (FIG. 21) is allowed in a case where there is the coordinate information embedding instruction. As a result, the image forming apparatus 20 prevents the identifier not allocated from the identifier management server 40 from being combined with the physical page and outputted and prevents occurrence of mismatching between the physical page and the identifier caused by the change of the print copy number.

Needless to say, the invention is not limited to the third and fourth exemplary embodiments described above.

Needless to say, the image forming apparatus 20 is not limited to the configuration in which the change of the print copy number is not allowed as in the third exemplary embodiment or the configuration in which only the reduction of the print copy number is allowed as in the fourth exemplary embodiment if the change input for increasing the print copy number is not allowed in a case where there is the coordinate information embedding instruction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an accumulation unit that accumulates image forming data for forming an image for each logical page and print copy number information for printing the image forming data;
   an instruction unit that instructs print of the image forming data accumulated in the accumulation unit;
   an output unit that outputs an image on a print medium based on the image forming data for which the instruction unit instructs the print and the print copy number information relating to the image forming data;
   an identifier computing unit that manages an identifier group in accordance with the number of logical pages of the image forming data and the print copy number information, and computes a unique identifier for each physical page output by the output unit from an initial identifier provided in response to a print request from an external apparatus which provides the initial identifier out of the identifier group;
   a combining unit that combines each identifier computed by the identifier computing unit with an image of each physical page output by the output unit; and
   a change unit that changes the print copy number information used by the output unit to output the image,
   wherein the combining unit does not perform the combining for an increased copy number of a physical page if the change unit increases the print copy number information.

2. The image forming apparatus according to claim 1, wherein, if the change unit increases the copy number information, the output unit does not perform the output of the image for the increased copy number of the physical page.

3. The image forming apparatus according to claim 2, further comprising:
   an information detection unit that detects information for combining the identifier with the physical page,
   wherein the combining unit performs the combining if the information detection unit detects the information for executing the combining and does not perform the combining if the information detection unit does not detect the information for executing the combining, and
   wherein, if the change unit increases the print copy number information and the information detection unit detects the information for executing the combining, the output unit performs the output of the image based on the print copy number information before the print copy number is increased.

4. The image forming apparatus according to claim 1, further comprising:
   an information detection unit that detects information for combining the identifier with the physical page,
   wherein the combining unit performs the combining if the information detection unit detects the information for executing the combining and does not perform the combining if the information detection unit does not detect the information for executing the combining, and
   wherein the change unit does not allow to increase the print copy number information to output the image if the information detection unit detects the information for executing the combining.

5. The image forming apparatus according to claim 4, wherein, if the information detection unit detects information for executing the combining, the change unit does not allow to change the print copy number information to output the image.

6. The image forming apparatus according to claim 4, wherein, if the information detection unit detects information for executing the combining, the change unit allows only to reduce the print copy number information to output the image.

7. The image forming apparatus according to claim 1, wherein the identifier group comprises a plurality of identifiers, and the unique identifiers are computed as sequential identifiers starting from the initial identifier.

8. An image forming apparatus comprising:
   an accumulation unit that accumulates image forming data for forming an image for each logical page and print copy number information for printing the image forming data;
   an instruction unit that instructs print of the image forming data accumulated in the accumulation unit;
   an output unit that outputs an image on a print medium based on the image forming data for which the instruction unit instructs the print and the print copy number information relating to the image forming data;
   an identifier computing unit that manages an identifier group in accordance with the number of logical pages of the image forming data and the print copy number information, and computes a different identifier for each physical page output by the output unit based on an initial identifier provided in response to a print request from an external apparatus which provides the initial identifier out of the identifier group;

a combining unit that combines each identifier computed by the identifier computing unit with an image of each physical page output by the output unit;

a change unit that changes the print copy number information used by the output unit to output the image; and an information detection unit that detects information for combining the identifier with the physical page, wherein the combining unit performs the combining if the information detection unit detects the information for executing the combining, and does not perform the combining if the information detection unit does not detect the information for executing the combining, and wherein, if the change unit increases the print copy number information and the information detection unit detects the information for executing the combining, the output unit performs the output of the image based on the print copy number information before the print copy number is increased.

9. An image forming apparatus comprising:

an accumulation unit that accumulates image forming data for forming an image for each logical page and print copy number information for printing the image forming data;

an instruction unit that instructs print of the image forming data accumulated in the accumulation unit;

an output unit that outputs an image on a print medium based on the image forming data for which the instruction unit instructs the print and the print copy number information relating to the image forming data;

an identifier computing unit that manages an identifier group in accordance with the number of logical pages of the image forming data and the print copy number information, and computes a different identifier for each physical page output by the output unit based on an initial identifier provided in response to a print request from an external apparatus which provides the initial identifier out of the identifier group;

a combining unit that combines each identifier computed by the identifier computing unit with an image of each physical page output by the output unit;

a change unit that changes the print copy number information used by the output unit to output the image; and an information detection unit that detects information for combining the identifier with the physical page, wherein the combining unit performs the combining if the information detection unit detects the information for executing the combining and does not perform the combining if the information detection unit does not detect the information for executing the combining, and wherein the change unit does not allow to increase the print copy number information to output the image if the information detection unit detects the information for executing the combining.

10. The image forming apparatus according to claim 9, wherein, if the information detection unit detects information for executing the combining, the change unit does not allow to change the print copy number information to output the image.

11. The image forming apparatus according to claim 9, wherein, if the information detection unit detects information for executing the combining, the change unit allows only to reduce the print copy number information to output the image.

12. An image forming system comprising:

an accumulation unit that accumulates image forming data for forming an image for each logical page and print copy number information for printing the image forming data;

an instruction unit that instructs print of the image forming data accumulated in the accumulation unit;

an output unit that outputs an image on a print medium based on the image forming data for which the instruction unit instructs the print and the print copy number information relating to the image forming data;

a providing unit that manages an identifier group in accordance with the number of logical pages of the image forming data and the print copy number information, and provides an initial identifier out of the identifier group;

an identifier computing unit that computes a unique identifier for each physical page output by the output unit from the initial identifier provided in response to a print request from the providing unit, a combining unit that combines each identifier computed by the identifier computing unit with an image of each physical page output by the output unit; and a change unit that changes the print copy number information used by the output unit to output the image, wherein the combining unit does not perform the combining for the increased copy number when the change unit increases the print copy number information.

13. The image forming system according to claim 12, wherein the identifier group comprises a plurality of identifiers, and the unique identifiers are computed as sequential identifiers starting from the initial identifier.

14. A non-transitory computer readable medium storing a program causing a computer to execute a process for controlling, the process comprising:

accumulating image forming data for forming an image for each logical page and print copy number information for printing the image forming data, instructing print of the image forming data accumulated in the accumulating step, outputting an image on a print medium based on the image forming data for which print is instructed in the instructing step and the print copy number information relating to the image forming data;

managing an identifier group in accordance with the number of logical pages of the image forming data and the print copy number information;

computing a unique identifier for each physical page output in the outputting step from an initial identifier provided in response to a print request from an external apparatus which provides the initial identifier out of the identifier group; and combining each identifier computed in computing the identifier with an image of each physical page output in the outputting step, wherein the combining is not performed for an increased copy number of a physical page if the print copy number information is increased.

15. The computer readable medium according to claim 14, wherein the identifier group comprises a plurality of identifiers, and the unique identifiers are computed as sequential identifiers starting from the initial identifier.

* * * * *